United States Patent
Miller et al.

(10) Patent No.: US 12,209,557 B1
(45) Date of Patent: Jan. 28, 2025

(54) GAS TURBINE ENGINE WITH FORWARD SWEPT OUTLET GUIDE VANES

(71) Applicant: General Electric Company, Schenectady, NY (US)

(72) Inventors: Brandon Wayne Miller, Middletown, OH (US); Arthur William Sibbach, Boxford, MA (US); Jeffrey Donald Clements, Mason, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/524,054

(22) Filed: Nov. 30, 2023

(51) Int. Cl.
*F02K 3/06* (2006.01)
*F02C 7/32* (2006.01)
*F02K 3/075* (2006.01)

(52) U.S. Cl.
CPC .................. *F02K 3/06* (2013.01); *F02C 7/32* (2013.01); *F02K 3/075* (2013.01); *F05D 2220/36* (2013.01); *F05D 2240/121* (2013.01)

(58) Field of Classification Search
CPC ... F02K 3/06; F02K 3/075; F02C 7/32; F05D 2220/36; F05D 2240/121
See application file for complete search history.

(56) References Cited

U.S. PATENT DOCUMENTS

| | | |
|---|---|---|
| 2,634,581 A | 4/1953 | Kent |
| 2,663,993 A | 12/1953 | Mosser |
| 3,533,486 A | 10/1970 | Paulson |
| 3,540,682 A | 11/1970 | Dibble et al. |
| 3,575,259 A | 4/1971 | Wilkinson |
| 3,618,876 A | 11/1971 | Skidmore et al. |
| 3,664,612 A | 5/1972 | Skidmore et al. |
| 3,819,008 A | 6/1974 | Evans et al. |
| 3,861,822 A | 1/1975 | Wanger |
| 3,981,466 A | 9/1976 | Shah |
| 4,010,608 A | 3/1977 | Simmons |
| 4,254,619 A | 3/1981 | Griffin, III et al. |
| 4,548,034 A | 10/1985 | Maguire |

(Continued)

FOREIGN PATENT DOCUMENTS

| | | |
|---|---|---|
| CN | 101922312 A | 12/2010 |
| EP | 2508711 A1 | 10/2012 |

(Continued)

OTHER PUBLICATIONS

Philip R. Gliebe, "Ultra-High Bypass Engine Aeroacoustic Study." NASA/CR—2003-212525 Oct. 2003. (Year: 2003).*

(Continued)

*Primary Examiner* — David P. Olynick
(74) *Attorney, Agent, or Firm* — Dority & Manning, P.A.

(57) ABSTRACT

A turbofan engine defining an axial direction and a longitudinal centerline along the axial direction is provided. The turbofan engine includes: a fan section having a fan; a turbomachine drivingly coupled to the fan, the turbomachine comprising an outer casing; an outer nacelle surrounding the fan and at least a portion of the turbomachine; an outlet guide vane extending between the turbomachine and the outer nacelle, the outlet guide vane defining a base and a tip and being forward swept from the base to the tip; and an accessory gearbox positioned at least partially inward of the outer casing of the turbomachine.

19 Claims, 17 Drawing Sheets

(56) References Cited

U.S. PATENT DOCUMENTS

| | | |
|---|---|---|
| 4,688,745 A | 8/1987 | Rosenthal Herman A. |
| 4,916,894 A | 4/1990 | Adamson et al. |
| 5,010,729 A | 4/1991 | Adamson et al. |
| 5,012,420 A | 4/1991 | Walker et al. |
| 5,458,457 A | 10/1995 | Goto et al. |
| 5,642,985 A | 7/1997 | Spear et al. |
| 5,791,136 A | 8/1998 | Utamura et al. |
| 6,195,983 B1 | 3/2001 | Wadia et al. |
| 6,409,469 B1 | 6/2002 | Tse |
| 6,431,820 B1 | 8/2002 | Beacock et al. |
| 6,457,938 B1 | 10/2002 | Liu et al. |
| 6,508,630 B2 | 1/2003 | Liu et al. |
| 6,540,477 B2 | 4/2003 | Glynn et al. |
| 6,546,734 B2 | 4/2003 | Antoine et al. |
| 6,585,482 B1 | 7/2003 | Liotta et al. |
| 6,655,632 B1 | 12/2003 | Gupta et al. |
| 6,834,505 B2 | 12/2004 | Al-Roub et al. |
| 6,935,833 B2 | 8/2005 | Seitz |
| 7,025,565 B2 | 4/2006 | Urso et al. |
| 7,055,304 B2 | 6/2006 | Courtot et al. |
| 7,210,900 B2 | 5/2007 | Urso et al. |
| 7,246,773 B2 | 7/2007 | Stoner et al. |
| 7,313,963 B2 | 1/2008 | Kuznar |
| 7,374,403 B2 | 5/2008 | Decker et al. |
| 7,374,404 B2 | 5/2008 | Schilling |
| 7,407,364 B2 | 8/2008 | Arnold et al. |
| 7,413,401 B2 | 8/2008 | Szucs et al. |
| 7,493,754 B2 | 2/2009 | Moniz et al. |
| 7,514,810 B2 | 4/2009 | Kern et al. |
| 7,575,412 B2 | 8/2009 | Seitz |
| 7,694,505 B2 | 4/2010 | Schilling |
| 7,716,914 B2 | 5/2010 | Schilling |
| 7,789,620 B2 | 9/2010 | Vontell, Sr. et al. |
| 7,849,669 B2 | 12/2010 | Keogh |
| 7,854,778 B2 | 12/2010 | Groom et al. |
| 7,871,244 B2 | 1/2011 | Marini et al. |
| 7,874,137 B2 | 1/2011 | Chaney et al. |
| 7,882,694 B2 | 2/2011 | Suciu et al. |
| 7,926,261 B2 | 4/2011 | Porte |
| 7,955,046 B2 | 6/2011 | McCune et al. |
| 7,966,806 B2 | 6/2011 | Henry et al. |
| 8,021,104 B2 | 9/2011 | Gu et al. |
| 8,105,042 B2 | 1/2012 | Parkin et al. |
| 8,186,942 B2 | 5/2012 | Haas |
| 8,226,360 B2 | 7/2012 | Scoggins et al. |
| 8,328,518 B2 | 12/2012 | Liang et al. |
| 8,375,695 B2 | 2/2013 | Schilling et al. |
| 8,397,487 B2 | 3/2013 | Sennoun et al. |
| 8,419,374 B2 | 4/2013 | Huth et al. |
| 8,529,188 B2 | 9/2013 | Winter |
| 8,572,943 B1 | 11/2013 | Sheridan |
| 8,747,055 B2 | 1/2014 | McCune et al. |
| 8,677,764 B2 | 3/2014 | Porte |
| 8,689,538 B2 | 4/2014 | Sankrithi et al. |
| 8,690,519 B2 | 4/2014 | Aalburg et al. |
| 8,757,959 B2 | 6/2014 | Suciu et al. |
| 8,806,871 B2 | 8/2014 | McMasters et al. |
| 8,899,915 B2 | 12/2014 | McCune et al. |
| 8,943,796 B2 | 2/2015 | McCaffrey |
| 8,956,108 B2 | 2/2015 | Eleftheriou et al. |
| 9,003,808 B2 | 4/2015 | Kupratis |
| 9,032,702 B2 * | 5/2015 | Beier ............... H02K 9/197 60/39.08 |
| 9,039,364 B2 | 5/2015 | Alvanos et al. |
| 9,045,991 B2 | 6/2015 | Read et al. |
| 9,068,470 B2 | 6/2015 | Mills et al. |
| 9,074,483 B2 | 7/2015 | Breeze-Stringfellow et al. |
| 9,109,514 B2 | 8/2015 | Cheong |
| 9,114,877 B2 | 8/2015 | Weber et al. |
| 9,140,212 B2 | 9/2015 | Moon et al. |
| 9,206,697 B2 | 12/2015 | Tibbott et al. |
| 9,206,740 B2 | 12/2015 | Wong et al. |
| 9,222,417 B2 | 12/2015 | Kupratis et al. |
| 9,228,497 B2 | 1/2016 | Ottow et al. |
| 9,239,005 B2 | 1/2016 | Strecker et al. |
| 9,506,361 B2 | 11/2016 | Fielding et al. |
| 9,523,284 B2 | 12/2016 | Miller et al. |
| 9,540,094 B2 | 1/2017 | Negulescu et al. |
| 9,695,751 B2 | 7/2017 | Kupratis et al. |
| 9,784,134 B2 | 10/2017 | Eleftheriou |
| 9,797,261 B2 | 10/2017 | Tibbott et al. |
| 9,835,092 B2 | 12/2017 | Sawyers-Abbott et al. |
| 9,840,930 B2 | 12/2017 | Lee et al. |
| 9,863,256 B2 | 1/2018 | Lee et al. |
| 9,874,102 B2 | 1/2018 | Azad et al. |
| 9,874,109 B2 | 1/2018 | Hatcher, Jr. et al. |
| 9,879,599 B2 | 1/2018 | Mercier et al. |
| 9,945,247 B2 | 4/2018 | Appukuttan et al. |
| 9,957,918 B2 | 5/2018 | Suciu et al. |
| 9,995,167 B2 | 6/2018 | Shepard |
| 10,018,167 B2 | 7/2018 | Tentorio |
| 10,054,052 B2 | 8/2018 | Zheng et al. |
| 10,060,270 B2 | 8/2018 | Lee et al. |
| 10,060,351 B2 | 8/2018 | Oggero |
| 10,066,508 B2 | 9/2018 | Geiger |
| 10,100,733 B2 | 10/2018 | O'Toole et al. |
| 10,113,444 B2 | 10/2018 | Huang et al. |
| 10,131,443 B2 | 11/2018 | Namgoong |
| 10,138,817 B2 | 11/2018 | Venter |
| 10,145,301 B2 | 12/2018 | Abrari et al. |
| 10,173,780 B2 | 1/2019 | Mackin et al. |
| 10,184,340 B2 | 1/2019 | Baltas et al. |
| 10,189,572 B2 | 1/2019 | Mackin et al. |
| 10,196,895 B2 | 2/2019 | Weinert et al. |
| 10,196,901 B2 | 2/2019 | Wong et al. |
| 10,215,192 B2 | 2/2019 | Griffin |
| 10,239,626 B2 | 3/2019 | Herchenroder et al. |
| 10,240,526 B2 | 3/2019 | Suciu et al. |
| 10,252,790 B2 | 4/2019 | Ramakrishnan |
| 10,260,527 B2 | 4/2019 | Steen |
| 10,273,880 B2 | 4/2019 | Kolvick et al. |
| 10,288,010 B2 | 5/2019 | Houston et al. |
| 10,288,083 B2 | 5/2019 | Miller et al. |
| 10,344,711 B2 | 7/2019 | Hsu |
| 10,371,054 B2 | 8/2019 | Sasse et al. |
| 10,378,554 B2 | 8/2019 | Yu et al. |
| 10,385,871 B2 | 8/2019 | Lurie et al. |
| 10,393,132 B2 | 8/2019 | Lee et al. |
| 10,399,664 B2 | 9/2019 | Bowden et al. |
| 10,415,409 B2 | 9/2019 | Oyarbide |
| 10,436,046 B2 | 10/2019 | Fentem et al. |
| 10,480,328 B2 | 11/2019 | Weaver et al. |
| 10,480,413 B2 | 11/2019 | Snyder |
| 10,502,232 B2 | 12/2019 | Mohtar et al. |
| 10,519,859 B2 | 12/2019 | Marchaj et al. |
| 10,557,415 B2 | 2/2020 | Boudebiza et al. |
| 10,563,513 B2 | 2/2020 | Kalitzin et al. |
| 10,634,059 B2 | 4/2020 | Rami et al. |
| 10,641,178 B2 | 5/2020 | Corrandini et al. |
| 10,690,146 B2 | 6/2020 | Urac et al. |
| 10,695,704 B2 | 6/2020 | Mook et al. |
| 10,711,797 B2 | 7/2020 | Kroger et al. |
| 10,724,395 B2 | 7/2020 | Kupratis et al. |
| 10,724,435 B2 | 7/2020 | Kroger et al. |
| 10,738,694 B1 | 8/2020 | Kupratis et al. |
| 10,787,909 B2 | 9/2020 | Hiernaux |
| 10,794,224 B2 | 10/2020 | Schiessl |
| 10,794,292 B2 | 10/2020 | Kupratis et al. |
| 10,794,395 B2 | 10/2020 | Tamada |
| 10,794,396 B2 | 10/2020 | Kroger et al. |
| 10,801,442 B2 | 10/2020 | Clements et al. |
| 10,815,886 B2 | 10/2020 | Kroger et al. |
| 10,816,208 B2 | 10/2020 | DiCintio et al. |
| 10,822,999 B2 | 11/2020 | Morris et al. |
| 10,823,114 B2 | 11/2020 | Clements et al. |
| 10,830,135 B2 | 11/2020 | Slawinska et al. |
| 10,837,361 B2 | 11/2020 | Abrari et al. |
| 10,883,515 B2 | 1/2021 | Lurie et al. |
| 10,961,864 B2 | 3/2021 | Miranda et al. |
| 11,085,515 B2 | 8/2021 | Moniz et al. |
| 11,118,601 B2 | 9/2021 | Yu et al. |
| 11,401,824 B2 | 8/2022 | Breeze-Stringfellow et al. |
| 11,421,627 B2 | 8/2022 | Moniz et al. |
| 11,480,063 B1 | 10/2022 | Miller et al. |

(56) References Cited

U.S. PATENT DOCUMENTS

| | | |
|---|---|---|
| 11,725,526 B1 | 8/2023 | Sibbach et al. |
| 2001/0023582 A1 | 9/2001 | Nagel |
| 2002/0197156 A1 | 12/2002 | Haller |
| 2005/0201856 A1 | 9/2005 | Koshoffer |
| 2006/0075754 A1* | 4/2006 | Champion ............... F02C 7/36 |
| | | 60/772 |
| 2006/0101804 A1* | 5/2006 | Stretton ................ F02K 3/04 |
| | | 60/226.1 |
| 2006/0272314 A1 | 12/2006 | Moniz et al. |
| 2008/0041064 A1 | 2/2008 | Moore et al. |
| 2008/0155959 A1 | 7/2008 | Rasheed et al. |
| 2008/0155989 A1 | 7/2008 | Roth |
| 2008/0159851 A1* | 7/2008 | Moniz .................. F02K 3/06 |
| | | 415/159 |
| 2008/0232963 A1 | 9/2008 | Durocher et al. |
| 2009/0123274 A1* | 5/2009 | Chaudhry ............... F02C 7/32 |
| | | 415/182.1 |
| 2009/0155053 A1 | 6/2009 | Speak |
| 2009/0155072 A1 | 6/2009 | Winter |
| 2009/0245997 A1 | 10/2009 | Hurwitz et al. |
| 2009/0255116 A1 | 10/2009 | McMasters et al. |
| 2009/0272850 A1 | 11/2009 | Rainous et al. |
| 2009/0277181 A1 | 11/2009 | Druon et al. |
| 2009/0293445 A1 | 12/2009 | Ress, Jr. |
| 2009/0317238 A1* | 12/2009 | Wood ................... F01D 5/147 |
| | | 415/177 |
| 2010/0080697 A1* | 4/2010 | Wojno .................. F01D 9/041 |
| | | 415/208.2 |
| 2010/0107650 A1* | 5/2010 | Ress, Jr. ............... F02C 7/32 |
| | | 290/52 |
| 2011/0044796 A1 | 2/2011 | Hussain et al. |
| 2012/0240594 A1 | 9/2012 | Shamara |
| 2012/0241561 A1 | 9/2012 | Shamara |
| 2013/0098058 A1* | 4/2013 | Sheridan ............... F01D 25/18 |
| | | 60/783 |
| 2013/0192263 A1 | 8/2013 | Suciu et al. |
| 2013/0223974 A1 | 8/2013 | Schwarz et al. |
| 2013/0319011 A1 | 12/2013 | Pescosolido et al. |
| 2013/0323011 A1 | 12/2013 | Chopra et al. |
| 2014/0020404 A1 | 1/2014 | Sheridan et al. |
| 2014/0037443 A1 | 2/2014 | Khan |
| 2014/0090386 A1* | 4/2014 | Cloft .................... F02C 7/32 |
| | | 60/801 |
| 2014/0208755 A1 | 7/2014 | Ekanayake et al. |
| 2014/0208768 A1 | 7/2014 | Bacic |
| 2014/0318137 A1 | 10/2014 | McMasters et al. |
| 2015/0176486 A1 | 6/2015 | Menheere et al. |
| 2015/0198050 A1 | 7/2015 | Lee et al. |
| 2015/0198163 A1 | 7/2015 | Lei et al. |
| 2015/0308353 A1 | 10/2015 | Gardner et al. |
| 2016/0003046 A1 | 1/2016 | Smith et al. |
| 2016/0017751 A1 | 1/2016 | Caruel |
| 2016/0047307 A1 | 2/2016 | Williamson et al. |
| 2016/0047308 A1 | 2/2016 | Williamson et al. |
| 2016/0047309 A1 | 2/2016 | Davidson et al. |
| 2016/0047335 A1 | 2/2016 | Davidson et al. |
| 2016/0084265 A1 | 3/2016 | Yu et al. |
| 2016/0195010 A1 | 7/2016 | Roberge |
| 2016/0298543 A1 | 10/2016 | Suciu et al. |
| 2017/0030213 A1 | 2/2017 | Vlasic et al. |
| 2017/0082028 A1 | 3/2017 | Duong et al. |
| 2017/0138202 A1 | 5/2017 | Wadia et al. |
| 2017/0146026 A1 | 5/2017 | Griffin |
| 2017/0175675 A1* | 6/2017 | Sabnis .................. F02C 3/04 |
| 2017/0191372 A1 | 7/2017 | Tralshawala et al. |
| 2017/0276018 A1 | 9/2017 | Bifulco et al. |
| 2017/0284220 A1 | 10/2017 | Roberge |
| 2017/0292532 A1 | 10/2017 | Wall |
| 2017/0297728 A1 | 10/2017 | Niergarth et al. |
| 2017/0298751 A1 | 10/2017 | Messmann et al. |
| 2017/0314509 A1 | 11/2017 | Laricchiuta et al. |
| 2017/0342839 A1 | 11/2017 | Miller et al. |
| 2018/0010617 A1 | 1/2018 | Casavant et al. |
| 2018/0045059 A1 | 2/2018 | Lee et al. |
| 2018/0094582 A1 | 4/2018 | Rosenau et al. |
| 2018/0106274 A1* | 4/2018 | Moniz ................... F04D 29/324 |
| 2018/0112546 A1 | 4/2018 | Griffin |
| 2018/0128179 A1 | 5/2018 | Staubach et al. |
| 2018/0135432 A1 | 5/2018 | Martin, Jr. et al. |
| 2018/0138766 A1 | 5/2018 | Moore et al. |
| 2018/0138767 A1 | 5/2018 | Moore et al. |
| 2018/0216527 A1 | 8/2018 | D'Angelo et al. |
| 2018/0216576 A1* | 8/2018 | Miller ................... B64D 29/00 |
| 2018/0223733 A1 | 8/2018 | Zhang et al. |
| 2018/0230944 A1 | 8/2018 | Suciu et al. |
| 2018/0283183 A1 | 10/2018 | Gallier et al. |
| 2018/0334916 A1 | 11/2018 | Lurie et al. |
| 2018/0363554 A1 | 12/2018 | Kroger et al. |
| 2018/0363675 A1 | 12/2018 | Kroger et al. |
| 2018/0363676 A1 | 12/2018 | Kroger et al. |
| 2018/0363677 A1 | 12/2018 | Kroger et al. |
| 2018/0363678 A1 | 12/2018 | Kroger et al. |
| 2019/0010868 A1 | 1/2019 | Davidson et al. |
| 2019/0048798 A1 | 2/2019 | Slawinska et al. |
| 2019/0063243 A1 | 2/2019 | Lemaire |
| 2019/0107119 A1 | 4/2019 | Yu et al. |
| 2019/0226402 A1 | 7/2019 | Kray et al. |
| 2019/0284693 A1 | 9/2019 | Task |
| 2019/0284940 A1 | 9/2019 | Task et al. |
| 2019/0338707 A1 | 11/2019 | Beecroft et al. |
| 2019/0368421 A1 | 12/2019 | Sweidan |
| 2020/0025001 A1* | 1/2020 | Boisson ................. F01D 9/042 |
| 2020/0025110 A1 | 1/2020 | Silkowski |
| 2020/0049077 A1 | 2/2020 | Schwarz et al. |
| 2020/0080432 A1 | 3/2020 | Filipenco |
| 2020/0088105 A1* | 3/2020 | Venter .................. B64D 27/10 |
| 2020/0123918 A1 | 4/2020 | Duong et al. |
| 2020/0141277 A1 | 5/2020 | Cooper et al. |
| 2020/0149421 A1 | 5/2020 | Lad |
| 2020/0165938 A1 | 5/2020 | Schreiber et al. |
| 2020/0276641 A1 | 9/2020 | Benard et al. |
| 2020/0284261 A1 | 9/2020 | Merchant et al. |
| 2020/0300174 A1 | 9/2020 | Williamson et al. |
| 2020/0316508 A1 | 10/2020 | Mook et al. |
| 2020/0347737 A1 | 11/2020 | Bordoni |
| 2021/0036392 A1 | 2/2021 | Taykov et al. |
| 2021/0078715 A1 | 3/2021 | Bevirt et al. |
| 2021/0087948 A1 | 3/2021 | Suciu |
| 2021/0108597 A1 | 4/2021 | Ostdiek et al. |
| 2021/0363921 A1* | 11/2021 | Thomas ................. F02C 7/045 |
| 2021/0404387 A1* | 12/2021 | Venter .................. F02C 7/32 |
| 2023/0028503 A1 | 1/2023 | Sibbach et al. |
| 2023/0053554 A1 | 2/2023 | Sibbach et al. |
| 2023/0060010 A1 | 2/2023 | Sibbach et al. |
| 2023/0119477 A1 | 4/2023 | Miller et al. |
| 2023/0175408 A1* | 6/2023 | Heeter .................. F01D 9/042 |
| | | 415/189 |
| 2023/0250723 A1* | 8/2023 | Kuropatwa ............. F01D 5/141 |
| | | 415/119 |
| 2023/0265862 A1 | 8/2023 | Sibbach et al. |
| 2023/0279872 A1 | 9/2023 | Miller et al. |
| 2023/0287837 A1 | 9/2023 | Sibbach et al. |

FOREIGN PATENT DOCUMENTS

| | | |
|---|---|---|
| FR | 1038694 A | 9/1953 |
| GB | 722001 A | 1/1955 |
| GB | 2403778 A | 1/2005 |

OTHER PUBLICATIONS

Willis, Quiet Clean Short-Haul Experimental Engine (QCSEE) Final Report, NASA-CR-159473, National Aeronautics and Space Administration, Contract NAS3-18021, QCSEE NASA Report NASA-CR-159473, Aug. 1979, 312 Pages.

* cited by examiner

GAS TURBINE ENGINE WITH FORWARD SWEPT OUTLET GUIDE VANES

FIELD

The present disclosure relates to a gas turbine engine having forward swept outlet guide vanes.

BACKGROUND

A gas turbine engine generally includes a turbomachine and a rotor assembly. Gas turbine engines, such as turbofan engines, may be used for aircraft propulsion. In the case of a turbofan engine, the rotor assembly may be configured as a fan assembly, and the turbofan engine may include an outer nacelle surrounding at least in part a fan of the fan assembly and a turbomachine configured to drive the fan.

The outer nacelle may be coupled to the turbomachine at least in part by a plurality of outlet guide vanes. The plurality of outlet guide vanes may be located downstream of the fan and operate to straighten an airflow from the fan during operation of the turbofan engine.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
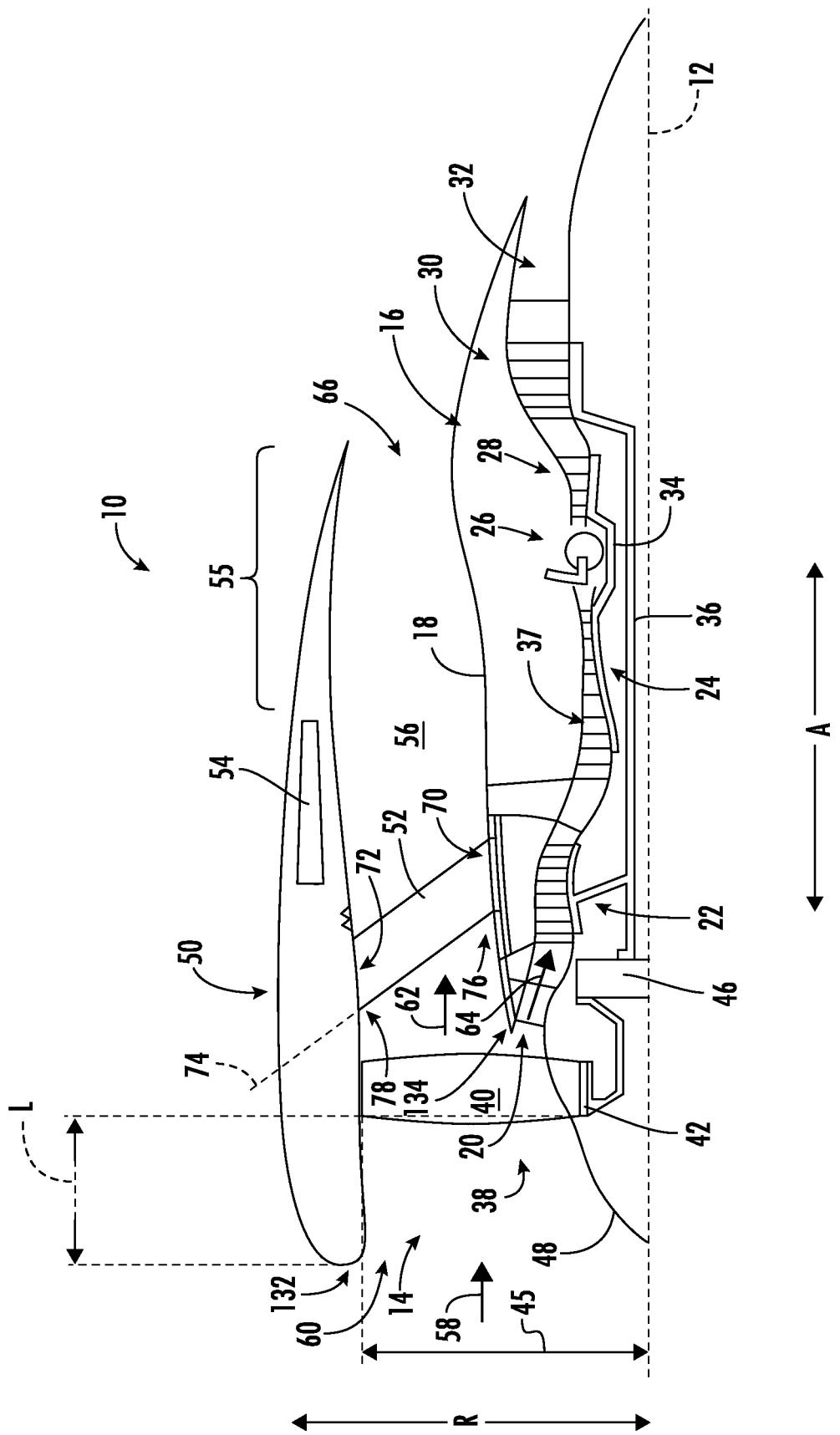
FIG. 1 is a cross-sectional view of a gas turbine engine in accordance with an exemplary aspect of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

The phrases "from X to Y" and "between X and Y" each refers to a range of values inclusive of the endpoints (i.e., refers to a range of values that includes both X and Y).

The term "turbomachine" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "low" and "high", or their respective comparative degrees (e.g., -er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" of the engine.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The term "bypass ratio" refers to a ratio in an engine of an amount of airflow that is bypassed around the engine's ducted inlet to the amount that passes through the engine's ducted inlet. For example, in the embodiment of FIG. 1, discussed below, the bypass ratio refers to an amount of airflow from the fan that flows over the outer casing to an amount of airflow from the fan that flows through the engine inlet.

The terms "coupled," "fixed," "attached to," and the like refer to both direct coupling, fixing, or attaching, as well as indirect coupling, fixing, or attaching through one or more intermediate components or features, unless otherwise specified herein.

As used herein, the terms "first", "second", and "third" may be used interchangeably to distinguish one component from another and are not intended to signify location or importance of the individual components.

For purposes of the description hereinafter, the terms "upper", "lower", "right", "left", "vertical", "horizontal", "top", "bottom", "lateral", "longitudinal", and derivatives thereof shall relate to the embodiments as they are oriented in the drawing figures. However, it is to be understood that the embodiments may assume various alternative variations, except where expressly specified to the contrary. It is also to be understood that the specific devices illustrated in the attached drawings, and described in the following specification, are simply exemplary embodiments of the disclosure. Hence, specific dimensions and other physical characteristics related to the embodiments disclosed herein are not to be considered as limiting.

Turbofan engine design continues to push for more efficient and compact engines. Traditionally, the design of turbofan engines has leaned towards the inclusion of radially-oriented or aft-swept Outlet Guide Vanes (OGVs). This design decision has been influenced by the need to minimize acoustic emissions and to keep the OGVs at a distance spaced from the fan blade tips. While these designs may address acoustic concerns, they require an elongated turbofan engine and outer nacelle. A longer outer nacelle can impact the aerodynamic performance and efficiency of the turbofan engine.

Contrary to the conventional turbofan engine design, the inventors of the present disclosure have found that inclusion of forward-swept OGVs can allow for desired shortening of the turbofan engine and outer nacelle, and inclusion of specific acoustic treatments on an outer casing of a turbomachine of the turbofan engine can address the specific acoustic concerns of such a design. In particular, inclusion of specific acoustic treatments on the outer casing may allow for the engine to remain acoustically compliant while benefiting from the structural and aerodynamic advantages of the forward-swept design. Such a configuration may therefore provide for improved aerodynamics and efficiency, attributes highly desired in the aerospace sector.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine, sometimes also referred to as a "turbofan engine 10." As shown in FIG. 1, the turbofan engine 10 defines an axial direction A (extending parallel to a longitudinal centerline 12 provided for reference), a radial direction R, and a circumferential direction C extending about the longitudinal centerline 12. In general, the turbofan engine 10 includes a fan section 14 and a turbomachine 16 disposed downstream from the fan section 14.

The exemplary turbomachine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft 34 (which may additionally or alternatively be a spool) drivingly connects the HP turbine 28 to the HP compressor 24. A low pressure (LP) shaft 36 (which may additionally or alternatively be a spool) drivingly connects the LP turbine 30 to the LP compressor 22. The compressor section, combustion section 26, turbine section, and jet exhaust nozzle section 32 together define a working gas flowpath 37.

For the embodiment depicted, the fan section 14 includes a fan 38 having a plurality of fan blades 40 coupled to a disk 42 in a spaced apart manner. The fan 38 more specifically includes a single stage of the fan blades 40, and thus may be referred to as a single stage fan. As depicted, the fan blades 40 extend outwardly from disk 42 generally along the radial direction R and define a fan diameter D, along the radial direction R (the fan diameter D equal to twice a fan radius 45, depicted in FIG. 1). In at least certain exemplary aspects, the fan diameter D may be greater than or equal to 4 feet and less than or equal to 18 feet. For example, in certain exemplary aspects, the fan diameter D may be greater than or equal to 5 feet, such as greater than or equal to 6 feet, such as greater than or equal to 8 feet.

The turbofan engine 10 further includes a power gearbox 46, and the fan blades 40 and disk 42 are together rotatable about the longitudinal centerline 12 by LP shaft 36 across the power gearbox 46. The power gearbox 46 includes a plurality of gears for adjusting a rotational speed of the fan 38 relative to a rotational speed of the LP shaft 36, such that the fan 38 may rotate at a more efficient fan speed. In certain exemplary embodiments, the power gearbox 46 may define a gear ratio of at least 2:1, such as at least 4:1, and less than or equal to 12:1.

Referring still to the exemplary embodiment of FIG. 1, the disk 42 is covered by a rotatable front hub 48 of the fan section 14 (sometimes also referred to as a "spinner"). The front hub 48 is aerodynamically contoured to promote an airflow through the plurality of fan blades 40.

Additionally, the exemplary fan section 14 includes an annular fan casing or outer nacelle 50 that circumferentially surrounds the fan 38 and/or at least a portion of the turbomachine 16. It should be appreciated that the outer nacelle 50 is supported relative to the turbomachine 16 by a plurality of circumferentially-spaced outlet guide vanes 52. The outer nacelle 50 defines a bypass airflow passage 56 with the turbomachine 16. As will be discussed in more detail below, the plurality of outlet guide vanes 52 are forward swept.

As is depicted schematically, the outer nacelle 50 houses a thrust reverser assembly 54 that may be employed during, e.g., landing operations, to help slow down an aircraft. Aft of the thrust reverser assembly 54, the outer nacelle 50 includes a closeout section 55 aerodynamically shaped to reduce a drag on the outer nacelle 50.

During operation of the turbofan engine 10, a volume of air 58 enters the turbofan engine 10 through an associated inlet 60 of the nacelle 50 and fan section 14. As the volume of air 58 passes across the fan blades 40, a first portion of air as indicated by arrow 62 is directed or routed into the bypass airflow passage 56 and a second portion of air as indicated by arrow 64 is directed or routed into the working gas flowpath 37, or more specifically into the LP compressor 22. The ratio between the first portion of air 62 and the second portion of air 64 is commonly known as a bypass ratio. Notably, in the present exemplary embodiment, the bypass ratio of the turbofan engine 10 may be at least 4:1, such as at least 5:1, such as at least 8:1, such as less than or equal to 20:1.

A pressure of the second portion of air 64 is increased as it is routed through the HP compressor 24 and into the combustion section 26, where it is mixed with fuel and burned to provide combustion gases.

The combustion gases are routed through the HP turbine 28 where a portion of thermal and/or kinetic energy from the combustion gases is extracted via sequential stages of HP turbine stator vanes that are coupled to the outer casing 18 and HP turbine rotor blades that are coupled to the HP shaft 34, thus causing the HP shaft 34 to rotate, thereby supporting operation of the HP compressor 24. The combustion gases are then routed through the LP turbine 30 where a second portion of thermal and kinetic energy is extracted from the combustion gases via sequential stages of LP turbine stator vanes that are coupled to the outer casing 18 and LP turbine rotor blades that are coupled to the LP shaft 36, thus causing the LP shaft 36 to rotate, thereby supporting operation of the LP compressor 22 and/or rotation of the fan 38.

The combustion gases are subsequently routed through the jet exhaust nozzle section 32 of the turbomachine 16 to provide propulsive thrust. Simultaneously, the pressure of the first portion of air (indicated at arrow 62) is substantially increased as the first portion of air is routed through the bypass airflow passage 56 before it is exhausted from a fan nozzle exhaust section 66 of the turbofan engine 10, also providing propulsive thrust.

In some exemplary embodiments, the exemplary turbofan engine 10 of the present disclosure may be a relatively large power class turbofan engine 10. Accordingly, when operated in a high power operating condition (e.g., takeoff), the turbofan engine 10 may be configured to generate a relatively large amount of thrust. More specifically, when operated in the high power operating condition, the turbofan engine 10 may be configured to generate at least about 20,000 pounds of thrust, such as at least about 25,000 pounds of thrust, such as at least about 30,000 pounds of thrust, and less than or equal to, e.g., about 150,000 pounds of thrust. Accordingly, the turbofan engine 10 may be referred to as a relatively large power class turbofan engine 10.

It should be appreciated, however, that the exemplary turbofan engine 10 depicted in FIG. 1 is by way of example only, and that in other exemplary embodiments, the turbofan engine 10 may have any other suitable configuration. For example, although the turbofan engine 10 depicted includes a fan 38 configured as a fixed pitch fan, in other embodiments, the turbofan engine 10 may alternatively include a fan having fan blades that are rotatable about a pitch axis by, e.g., a pitch change mechanism.

As will be appreciated, the turbofan engine 10 of the present disclosure is designed to reduce an overall length of the turbofan engine 10, improving various aerodynamic aspects of the turbofan engine 10, improving an overall efficiency of the turbofan engine 10, and improving various packaging concerns for the turbofan engine 10.

In particular, the turbofan engine 10 is provided with a reduced overall length at least in part due to the plurality of outlet guide vanes 52. In particular, the plurality of outlet guide vanes 52 includes an outlet guide vane 52 extending between the turbomachine 16 and the outer nacelle 50, defining a base 70 at an inner end along the radial direction R and a tip 72 at an outer end along the radial direction R, respectively. Contrary to conventional design understandings, the outlet guide vane 52 is forward swept from the base 70 to the tip 72.

Figure 2:
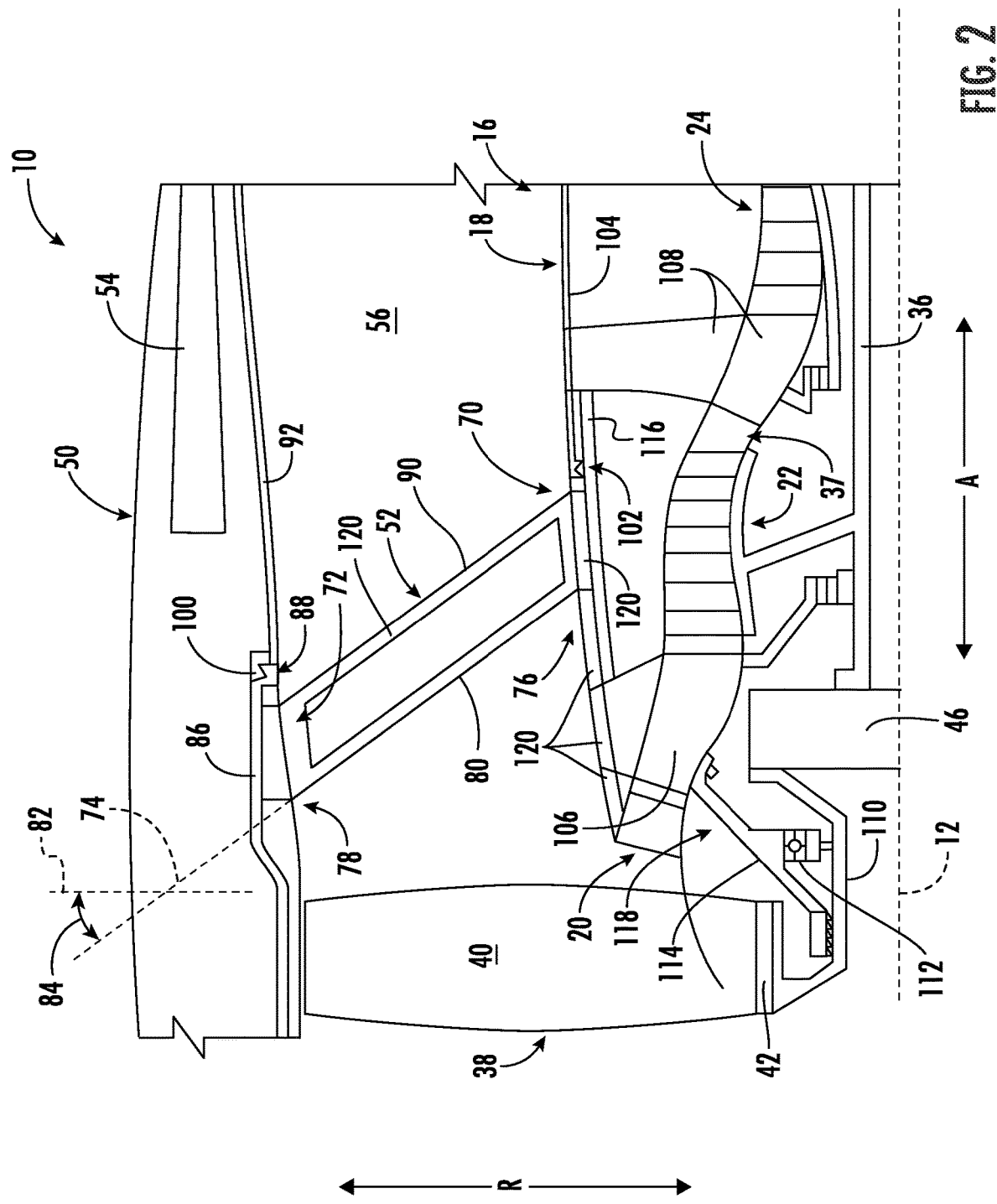
FIG. 2 is a close-up view of a portion of the exemplary gas turbine engine of FIG. 1.

More specifically, referring now also to FIG. 2, providing a close-up view of the outlet guide vane 52 of FIG. 1, the outlet guide vane 52 defines an OGV reference line 74 extending from an inner junction 76 between the outlet guide vane 52 and the turbomachine 16 at a leading edge 80 of the outlet guide vane 52, and an outer junction 78 between the outlet guide vane 52 and the outer nacelle 50 at the leading edge 80 of the outlet guide vane 52. The turbofan engine 10 further defines a radial reference line 82 extending perpendicularly from the longitudinal centerline 12 of the turbofan engine 10. An angle 84 between the OGV reference line 74 and the radial reference line 82 is at least five (5) degrees and less than or equal to 45 degrees. In particular, the embodiment shown, the angle 84 is as least 15 degrees and less than or equal to 35 degrees. In such a manner, it will be appreciated that the outer junction 78 is located forward of the inner junction 76.

Including the outlet guide vane 52 being forward swept in the manner described hereinabove may allow for a shortening of the outer nacelle 50. In particular, it will be appreciated that the outer nacelle 50 in the embodiment shown includes the thrust reverser assembly 54 and the closeout section 55 located aft of the thrust reverser assembly 54. A length of the thrust reverser assembly 54 along the axial direction A may be difficult to shorten. Further, a relatively fixed length along the axial direction A may be required for the closeout section 55 for aerodynamic purposes. The inventors of the present disclosure found that the thrust reverser assembly 54 and closeout section 55 may not be moved forward of the tip 72 of the outlet guide vane 52. Accordingly, in order to allow for the thrust reverser assembly 54 and closeout section 55 of the outer nacelle 50 to be moved forward, therefore allowing for an overall shorter outer nacelle 50 and turbofan engine 10, the inventors of the present disclosure went against conventional turbofan engine design and provided the outlet guide vane 52 in the forward swept configuration.

In particular, referring still also to FIG. 2, it will be appreciated that the outer nacelle 50 includes a nacelle case 86, with the tip 72 of the outlet guide vane 52 coupled to the nacelle case 86. Further, the outer nacelle 50 includes an outer attachment groove 88 located aft of a trailing edge 90 of the outlet guide vane 52 at the tip 72. For the embodiment shown, the outer attachment groove 88 is configured as part of the nacelle case 86.

As will be appreciated, in at least certain configurations, the outer attachment groove 88 must be positioned aft of the trailing edge 90 of the outlet guide vane 52 at the tip 72 (an aft-most connection between the outlet guide vane 52 and the nacelle case 86), and the thrust reverser assembly 54 must be positioned aft of the outer attachment groove 88. Accordingly, moving the aft-most connection between the outlet guide vane 52 and the nacelle case 86 forward, by virtue of including the outlet guide vane 52 in the forward slept configuration, may allow for moving the thrust reverser assembly 54 forward.

Figure 3:
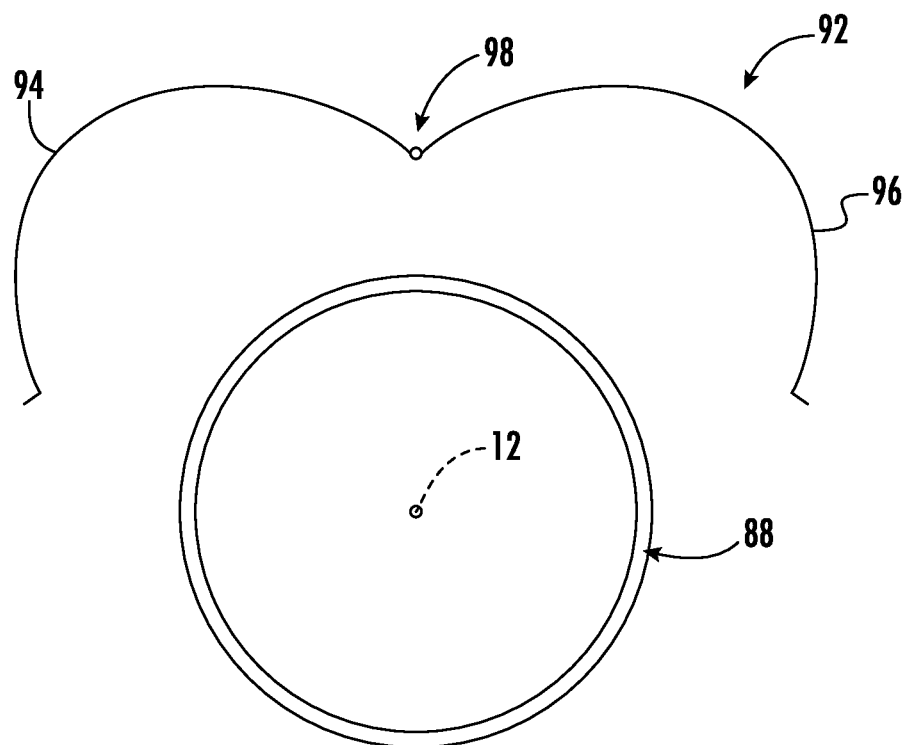
FIG. 3 is a schematic, axial view of a portion of an outer casing of a turbomachine of the exemplary gas turbine engine of FIG. 1.

Notably, the outer nacelle 50 further includes an aft nacelle liner 92 configured to attach to the outer attachment groove 88. In particular, referring briefly also to FIG. 3, providing a schematic view of the aft nacelle liner 92 and the outer attachment groove 88 along the axial direction A, the aft nacelle liner 92 includes a first section 94 and a second section 96. The first section 94 and the second section 96 are each semicircular shape and together define a hinged connection 98 therebetween. Further, the first section 94 and the second section 96 each include a lip 100 (see FIG. 2) which fits into the outer attachment groove 88. The first section 94 and the second section 96 may be fitted over the outer attachment groove 88 and coupled at respective distal ends to attach the aft nacelle liner 92 to the nacelle case 86.

Referring back particularly to FIG. 2, it will be appreciated that the turbomachine 16 further includes an inner attachment groove 102. The inner attachment groove 102 is configured as part of a frame of the turbomachine 16, as will be discussed in more detail below. In particular, the outer casing 18 of the turbomachine 16 includes an aft outer casing liner 104. The aft outer casing liner 104 may be coupled to the inner attachment groove 102 in a similar manner as the aft nacelle liner 92 is attached to the outer attachment groove 88, described above. Accordingly, the aft outer casing liner 104 may be coupled to the inner attachment groove 102 of the turbomachine 16 in the same or similar manner as described above with reference to FIG. 3.

As will be appreciated, by virtue of the forward swept configuration of the outlet guide vane 52, the inner attachment groove 102 is located aft of the outer attachment groove 88. Further, in the exemplary embodiment of FIG. 2, it will be appreciated that the outer attachment groove 88 and the inner attachment groove 102 are each configured as V-grooves (e.g., each groove having a "V" shape).

It will be appreciated, however, that in other exemplary embodiments, the inner attachment groove 102, the outer attachment groove 88, or both may have other suitable configurations.

Moreover, referring still to FIG. 2, the base 70 of the outlet guide vane 52 is coupled to a frame of the turbomachine 16. As will be appreciated, the turbomachine 16 includes a compressor forward frame 106 and an inter-compressor frame 108. The compressor forward frame 106 is located forward of the LP compressor 22 along the working gas flowpath 37. The inter-compressor frame 108 is located aft of the LP compressor 22 and forward of the HP compressor 24.

As will be appreciated from the view of FIG. 2, the compressor forward frame 106 supports rotation of a fan shaft 110 (extending from the power gearbox 46 to the fan 38) and further supports the LP shaft 36 through one or more bearings 112. Notably, the fan shaft 110 is supported by the compressor forward frame 106 through a sump cone 114 (which may be an "A sump cone") extending from the compressor forward frame 106.

The base 70 of the outlet guide vane 52 is located aft of the compressor forward frame 106 and forward of the inter-compressor frame 108. In such a manner, it will be appreciated that the outlet guide vane 52 defines the inner junction 76 between the outlet guide vane 52 and the turbomachine 16 at the leading edge 80 of the outlet guide vane 52. The inner junction 76 is aligned with the LP compressor 22 along the longitudinal centerline 12.

In order to support the base 70 of the outlet guide vane 52 with such a configuration, the turbomachine 16 further includes a shell frame 116, with the outlet guide vane 52 coupled to the shell frame 116. The shell frame 116 is located between the compressor forward frame 106 and the inter-compressor frame 108.

In particular, for the embodiment depicted, the shell frame 116 extends between and is coupled to both the compressor forward frame 106 in the inter-compressor frame 108 to support the outlet guide vane 52.

Notably, since the base 70 of the outlet guide vane 52 is positioned aft of the compressor forward frame 106 for the embodiment shown, the compressor forward frame 106 may not be as stiff as it otherwise would be if the base 70 of the outlet guide vanes 52 were aligned with the compressor forward frame 106 along the axial direction A. Accordingly, for the embodiment shown, the turbomachine 16 includes a load reduction device 118 integrated into the sump cone 114 or into an attachment of the sump cone 114 (e.g., an attachment between the sump cone 114 and the compressor forward frame 106). The load reduction device 118 may be a designated failure point within the sump cone 114 and/or within the attachment such that in the event of a failure condition (e.g., a blade-out condition of the fan 38), excessive vibrations may cause the sump cone 114 to fail, insulating the compressor forward frame 106 from having to absorb such vibrations.

In certain exemplary aspects, the load reduction device 118 may include a portion of the sump cone 114 having a reduced thickness, a portion of the sump cone 114 having perforations, etc.

Referring still to FIG. 2, the inventors found that inclusion of the outlet guide vane 52 configured in the forward swept orientation as described above may have an undesirable effect on the acoustics of the turbofan engine 10 at least in part due to a proximity of the tip 72 of the outlet guide vane 52 to the plurality of fan blades 40. In particular, the inventors found that such configuration may generate acoustic waves, further that such a configuration may direct at least a portion of said acoustic waves inwardly along the radial direction R from the outlet guide vane 52.

However, the inventors further found that the undesirable effect on the acoustics of the turbofan engine 10 may be addressed by further including an acoustic treatment 120 attached to or integrated with the outer casing 18 at a location aligned with the outlet guide vanes 52 along the longitudinal centerline 12.

It will be appreciated that as used herein, the term "aligned with the outlet guide vane 52 along the longitudinal centerline 12" refers to any position along the longitudinal centerline 12 between a forward-most location of the outlet guide vane 52 and an aft-most location of the outlet guide vane 52.

In particular, in the embodiment shown, the outlet guide vane 52 defines the inner junction 76 with the outer casing 18 of the turbomachine 16 at the leading edge 80 of the outlet guide. The acoustic treatment 120 is located at the inner junction 76 (e.g., aligned with the inner junction 76 along the longitudinal centerline 12), forward of the inner junction 76, or both. More specifically, it will be appreciated that the turbomachine 16 defines a distance along the axial direction A from the inlet 20 of the turbomachine 16 to the inner junction 76. The acoustic treatment 120 extends along the axial direction A at least 50% of the distance, such as at least 75% of the distance. More specifically, still, from embodiment depicted, the acoustic treatment 120 extends 100% of the distance along the axial direction A from the inlet to the inner junction 76.

In the embodiment depicted, the acoustic treatment 120 includes three acoustic treatments 120 spaced along the axial direction A between the inner junction 76 and the inlet 20. The turbofan engine 10 further includes an additional acoustic treatment 120 at least partially aft of the inner junction 76.

Further, for the embodiment depicted, in order to further attenuate noise generated as a result of the forward swept configuration of the outlet guide vane 52, the turbofan engine 10 further includes an acoustic treatment 120 integrated into the outlet guide vane 52 on a pressure side, on a suction side, or both. In particular, for the embodiment shown, the acoustic treatment 120 is integrated into the pressure side.

Figure 4:
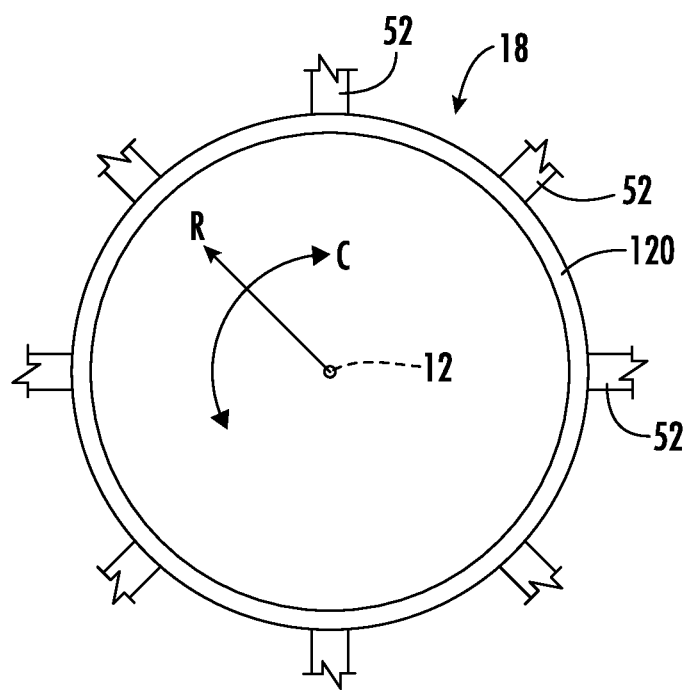
FIG. 4 is another schematic, axial view of a portion of the outer casing of the turbomachine of the exemplary gas turbine engine of FIG. 1.

Referring now to FIG. 4, it will be appreciated that the acoustic treatment 120 extends along a circumferential direction C, and more specifically extends substantially continuously along the circumferential direction C. In particular, FIG. 4 provides a schematic view of the outer casing 18 of the turbomachine 16 of FIG. 2 at a location between the inlet 20 and the inner junction 76. In the embodiment shown, the acoustic treatment 120 extends 360 degrees in the circumferential direction C.

The acoustic treatment 120 incorporated may have any suitable configuration, or any suitable combination of configurations.

Figure 5:
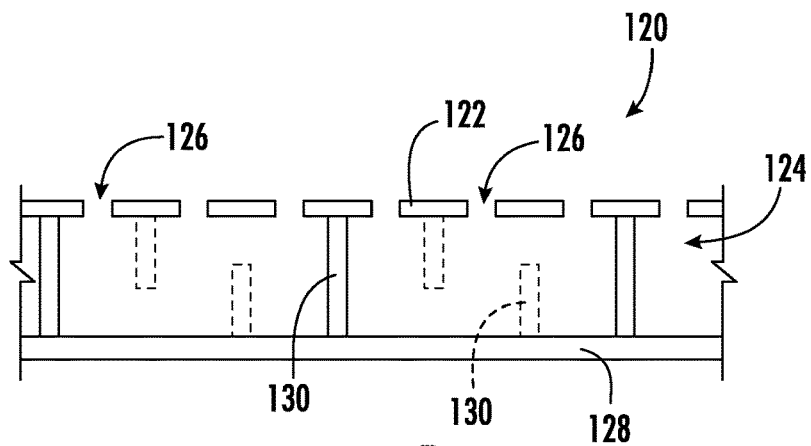
FIG. 5 is a schematic view of an acoustic treatment in accordance with an exemplary aspect of the present disclosure.

In at least certain exemplary embodiments, the acoustic treatment 120 may include a perforated sheet 122 with a hollow body 124. In particular, referring now to FIG. 5, a schematic, cross-sectional view is provided of an acoustic treatment 120 in accordance with an exemplary aspect of the present disclosure. As shown in the embodiment of FIG. 5, the exemplary acoustic treatment 120 includes the perforated sheet 122 and the hollow body 124. The hollow body 124 includes a liner 128 defining an interior void adjacent to the perforated sheet 122. The perforated sheet 122 defines a plurality of openings 126 allowing an external environment to communicate with the interior void of the hollow body 124. Acoustic waves may enter the hollow body 124 through the plurality of openings 126, allowing for an attenuation of the noise generated by virtue of the orientation of the outlet guide vanes 52 in the forward swept arrangement.

The perforated sheet 122 is coupled to the liner 128 through a plurality of extensions 130 extending from the perforated sheet 122 to the liner 128. In certain exemplary embodiments, the acoustic treatment 120 may further include additional structures to increase noise attenuation achieved by the acoustic treatment 120 at desired frequencies. The additional structures may be walls or other extensions 130 (depicted in phantom) extending from the perforated sheet 122, extending from the liner 128, or both; may be perforations in the walls or extensions 130; may be additional or alternative walls or extensions 130; etc.

Figure 6:
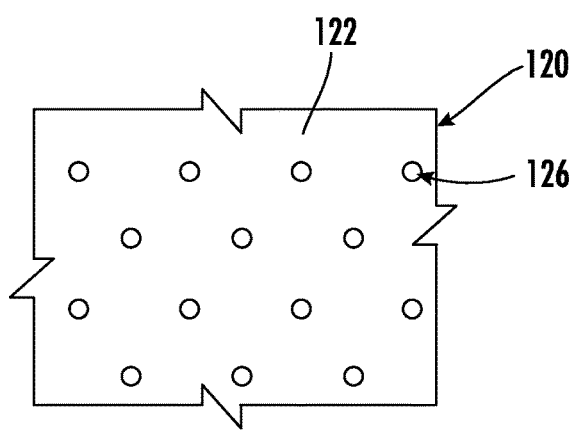
FIG. 6 is a schematic view of an acoustic treatment in accordance with another exemplary aspect of the present disclosure.

Referring now to FIG. 6, a schematic, a top view is provided of a perforated sheet 122 in accordance with an exemplary aspect of the present disclosure. The perforated sheet 122 may include a plurality of openings 126 spaced in a uniform manner.

Figure 7:
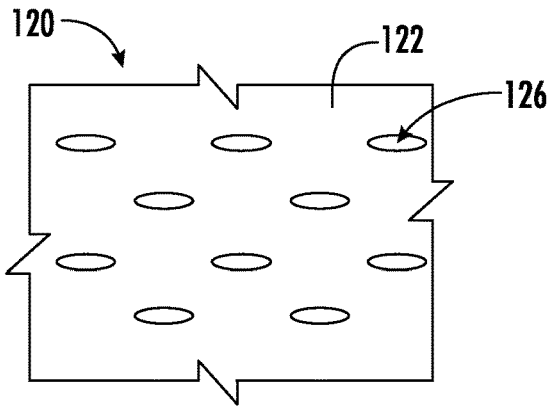
FIG. 7 is a schematic view of an acoustic treatment in accordance with yet another exemplary aspect of the present disclosure.

Referring now to FIG. 7, a schematic, a top view is provided of a perforated sheet 122 accordance with another exemplary aspect of the present disclosure. As will be appreciated from the view of FIG. 7, the plurality of openings 126 of the perforated sheet 122 may define a noncircular shape, such as an elongated or ovular shape.

Figure 8:
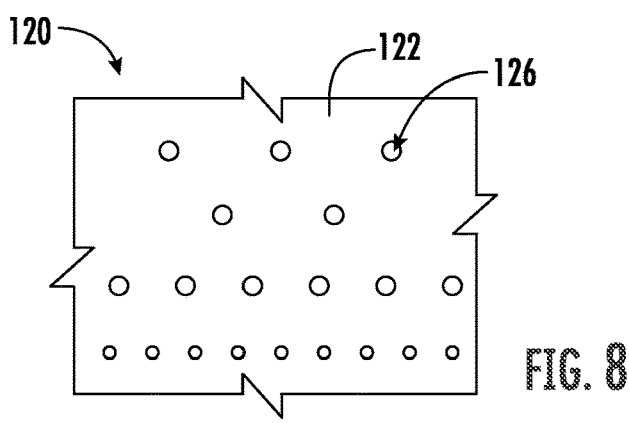
FIG. 8 is a schematic view of an acoustic treatment in accordance with still another exemplary aspect of the present disclosure.

Referring now to FIG. 8, a schematic, a top view is provided of a perforated sheet 122 in accordance with yet another exemplary embodiment of the present disclosure. As will be appreciated from the view of FIG. 8, the plurality of openings 126 may define a nonuniform size and a nonuniform spacing. Such a configuration may, e.g., allow for the acoustic treatment 120 to target noise at various frequencies.

Referring briefly back to FIG. 1, it will be appreciated that although a single outlet guide vane 52 is described hereinabove with reference to FIGS. 1 through 7, the turbofan engine 10 further includes a plurality of outlet guide vanes 52. Each of the plurality of outlet guide vanes 52 may be oriented in substantially the same manner as the exemplary outlet guide vanes 52 described above. Accordingly, it will be appreciated that each outlet guide vane 52 of the plurality of outlet guide vanes 52 may define a base 70 and a tip 72 and be forward swept from the base 70 to the tip 72 in the same manner as the outlet guide vane 52 described above. The plurality of outlet guide vanes 52 may be spaced along the circumferential direction C, as is depicted schematically, e.g., in FIG. 4.

Moreover, as described above, orienting the plurality of outlet guide vanes 52 in a forward swept configuration may allow for movement of, e.g., the thrust reverser assembly 54 and closeout section 55 of the outer nacelle 50 forward. In order to further reduce an overall length of the outer nacelle 50 and turbofan engine 10, the turbofan engine 10 in the embodiment shown further includes a relatively short inlet section. In particular, it will be appreciated that the outer nacelle 50 defines an inlet length L. The inlet length L refers to a distance along the axial direction A between a leading edge 132 of the outer nacelle 50 and a leading edge of the fan blades 40 where the fan blades 40 meet the hub 48. In the embodiment shown, the turbofan engine 10 defines a ratio of the inlet length L to the fan diameter D equal to or less than 0.5.

The inclusion of the plurality of outlet guide vanes 52 oriented in the forward swept configuration, and further including acoustic treatment(s) 120 in accordance with one or more exemplary aspects of the present disclosure, may allow for the turbofan engine 10 to achieve the desired shorter length, while addressing any acoustic effects resulting from such configuration.

Referring now to an additional and/or alternative exemplary configuration of the present disclosure, it will be appreciated that the demand for more aerodynamically efficient and compact turbofan engines remains strong. Prior design of turbofan engines has favored the placement of an accessory gearbox ("AGB") within an outer nacelle of the turbofan engines, e.g., due to the conventionally more favorable environmental conditions and a goal of saving space within an outer casing of a turbomachine of the turbofan engines. This arrangement, in combination with traditionally used radially-oriented or aft-swept outlet guide vanes (OGVs), may result in a longer overall turbofan engine, including a longer outer nacelle. Though this design may provide suitable environmental conditions for the AGB, the inventors of the present disclosure have found that it may result in detrimental aerodynamic lines and overall engine efficiency.

In particular, contrary to previous turbofan engine design, the inventors have found that by including forward-swept OGVs, a length of the outer nacelle may be significantly shortened. As part of this modification, however, the inventors found that such a reduction would pose challenges for the placement of the AGB in the outer nacelle, potentially resulting in aerodynamic compromises or requiring an otherwise unnecessary elongation of the outer nacelle. Accordingly, the inventors found that by positioning the AGB, or at least part of it, inside the outer casing of the turbomachine, the above issues with the outer nacelle may be avoided, resulting in a balanced approach to maintain turbofan engine compactness without compromising desired aerodynamic and efficiency properties.

Figure 9:
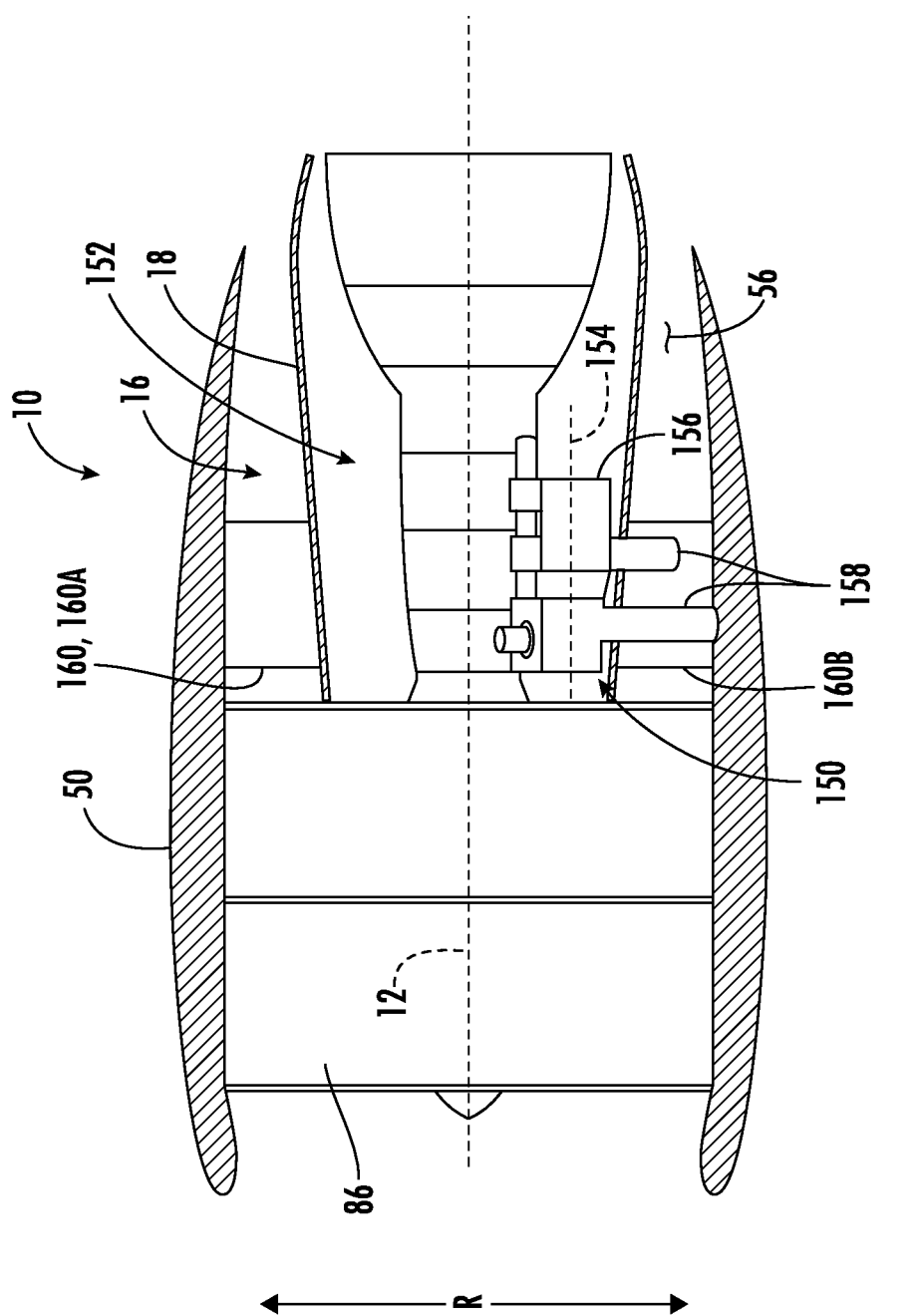
FIG. 9 is a cross-sectional view of a gas turbine engine in accordance with another exemplary aspect of the present disclosure.

Referring now to FIG. 9, a schematic view of a turbofan engine 10 in accordance with another exemplary embodiment of the present disclosure is provided. The exemplary turbofan engine 10 of FIG. 9 may be configured in a similar manner as the exemplary turbofan engine 10 described above with reference to FIGS. 1 through 8.

For example, the exemplary turbofan engine 10 of FIG. 9 generally includes an outer nacelle 50 and a turbomachine 16. The outer nacelle 50 includes a nacelle case 86, which in the embodiment depicted, surrounds and obstructs from view, a fan section 14 having a fan 38 and a plurality of outlet guide vanes 52. The plurality of outlet guide vanes 52 may be configured in substantially the same manner as the exemplary outlet guide vanes 52 of the turbofan engine 10 described above. Accordingly, the plurality of outlet guide vanes 52 may each define a base 70 and a tip 72 and be forward swept from the base 70 to the tip 72.

Further, the turbomachine 16 includes an outer casing 18 and an accessory gearbox 150. For the embodiment shown, the accessory gearbox 150 is positioned at least partially inward of the outer casing 18 of the turbomachine 16 along the radial direction R. In such a manner, it will be appreciated that the accessory gearbox 150 may be at least partially confined within the outer casing 18.

In certain embodiments, the accessory gearbox 150 may be mounted or operably coupled to an engine core 152 of the turbomachine 16 with a hinge mount. That is, when one or more clasps or fasteners is removed, the accessory gearbox 150 can swing away from at least part of the engine core 152 to which a remainder of the accessory gearbox 150 remains operably coupled to. The accessory gearbox 150 is operably coupled to the engine core 152 in a location and orientation so as to provide easy access to the accessory gearbox 150 and other component such as, but not limited to, fuel lines, electrical cables, electrical connectors, oil tubes, sight glasses, and fill ports.

The accessory gearbox 150 defines an AGB axis 154. In the illustrated example, the AGB axis 154 is parallel to the turbine engine axis of rotation (longitudinal centerline 12) when the accessory gearbox 150 is fully installed and in use within the turbine engine 10. It is contemplated, however, that the AGB axis 154 and the turbine engine axis of rotation can be at any suitable angle and need not be parallel.

More specifically, for the exemplary embodiment depicted, the accessory gearbox 150 includes a first portion 156 and a second portion 158. The first portion 156 is positioned at least partially within the outer casing 18 of the turbomachine 16 and the second portion 158 is positioned at least partially outside of the outer casing 18, e.g., along a radial direction R of the turbofan engine 10. In particular, for the embodiment depicted, the first portion 156 is positioned entirely within the outer casing 18. In particular, in the embodiment shown, the first portion 156 of the accessory gearbox 150 can straddle the engine core 152 within the outer casing 18.

More specifically, still, from embodiment depicted, the turbofan engine 10 includes one or more struts 160 extending between the turbomachine 16 and the outer nacelle 50. In particular, the turbofan engine 10 depicted includes an upper strut 160A and a lower strut 160B. The first portion 156 of the accessory gearbox 150 is positioned inward of the outer casing 18 of the turbomachine 16 along the radial direction R and the second portion 158 of the accessory gearbox 150 extends into the lower strut 160B of the turbofan engine 10 for the embodiment depicted.

In such a manner, it will be appreciated that for the embodiment depicted, the second portion 158 of the accessory gearbox 150 is located (at least partially) between the outer casing 18 and the outer nacelle 50. Referring still to FIG. 9, the second portion 158 of the accessory gearbox 150 is illustrated as being perpendicular to the AGB axis 154.

However, in other embodiments, it is further contemplated that the second portion 158 and the AGB axis 154 can be at any relative angle.

Figure 10:
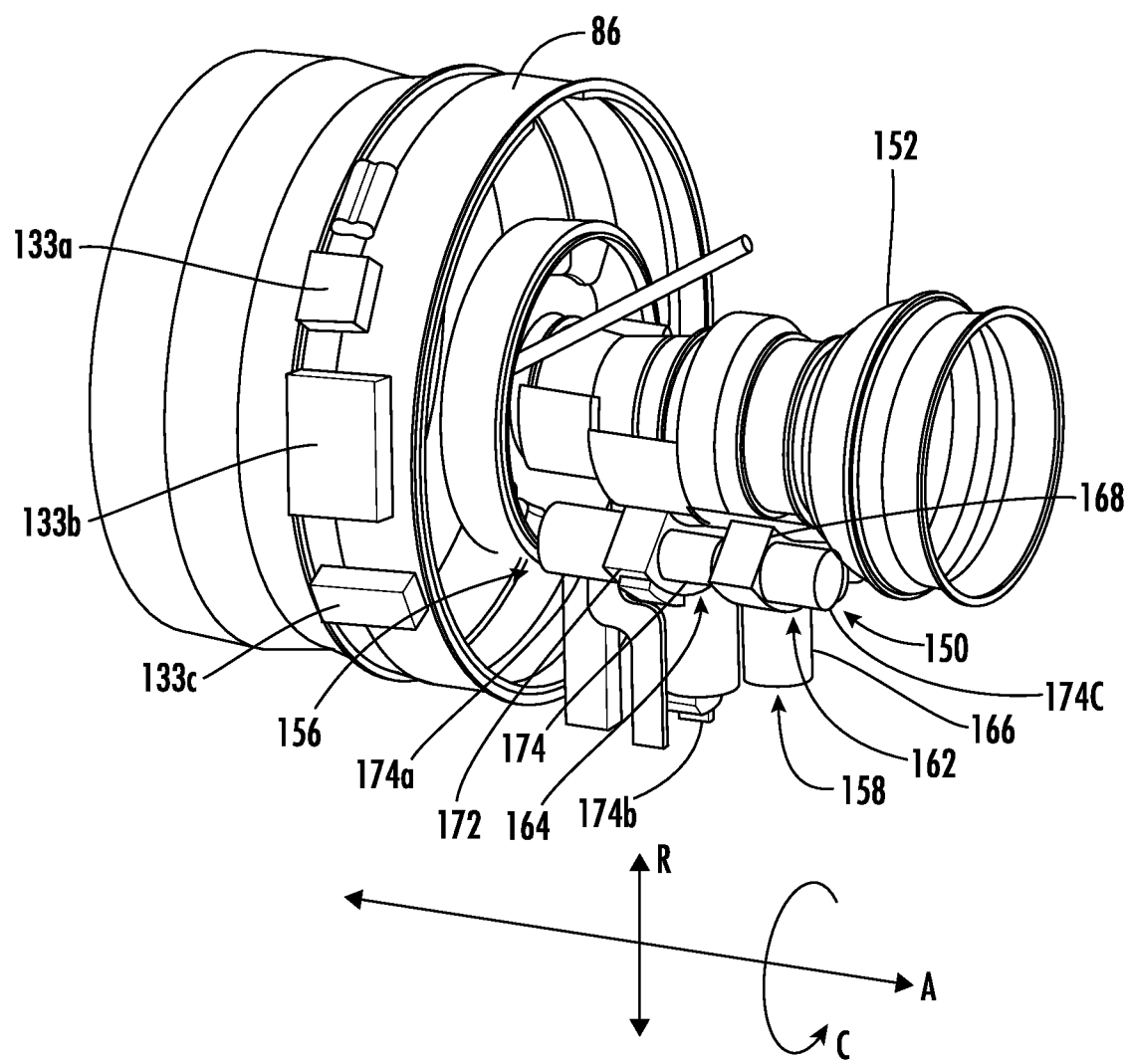
FIG. 10 is a perspective view of a portion of the exemplary gas turbine engine of FIG. 9.

Referring now to FIG. 10, FIG. 10 further illustrates the accessory gearbox 150 provided with the engine core 152. The body of the outer nacelle 50 (FIG. 9), outer casing 18 (FIG. 9), and internal portions of the engine core 152 have not been illustrated for clarity. A set of forks illustrated as a first fork 162 and a second fork 164 can be included in the accessory gearbox 150. As used herein, the term "fork" is a Y-shaped object having an upright or base from which two arms branch off in different directions.

In the illustrated example, the first fork 162 includes a first base portion 166 defined by a part of the second portion 158 of the accessory gearbox 150. A first arm 168 and a second arm 170 (not shown as it wraps behind the engine core 152) extend from the first base portion 166. The first arm 168 and the second arm 170 are part of the first portion 156 of the accessory gearbox 150 that can straddle the engine core 152. That is, the first base portion 166 extends, forks, splits, branches, or otherwise couples to the first arm 168 and the second arm 170, where the first arm 168 and the second arm 170 form a V-shape, U-shape, or the like, in order to cradle, straddle, or otherwise partially circumscribe the engine core 152.

Similarly, the second fork 164 can be defined by a second base portion that forks, splits, or otherwise couples to a first arm 172 and a second arm (not shown as it wraps behind the engine core 152) that straddle the engine core 152. It is contemplated that any number of one or more forks can be included in the accessory gearbox 150.

The first fork 162 and the second fork 164 are illustrated as being spaced along the AGB axis 154. The first fork 162 and the second fork 164 can be coupled via one or more of a drive shaft, gearbox, hydraulic drive, or the like. The drive shaft or a hydraulic drive can include one or more casings 174 positioned between the first fork 162 and the second fork 164. It is contemplated that only a single fork can be included or that additional sections, casing, drive shafts, or the like, can be included to increase the number of interfaces or forks.

The accessory gearbox 150 can couple to any number of interfaces, illustrated, by way of non-limiting example as interfaces 174a, 174b, 174c. Additionally, it is contemplated that the accessory gearbox 150 can couple to any number of components or systems illustrated, by way of non-limiting example as systems 133a, 133b, 133c. Systems powered by the accessory gearbox 150 can be located at axially or radially spaced locations relative to the accessory gearbox 150. By way of example, systems or interfaces can include, but are not limited to, any one or more of an output shaft, fuel pump, transfer gearbox, lubrication pump, air compressor, scavenge pump, electrical generator, fuel control, fuel pump, permanent magnet alternator, lubrication pump, or hydraulic pump.

Figure 11:
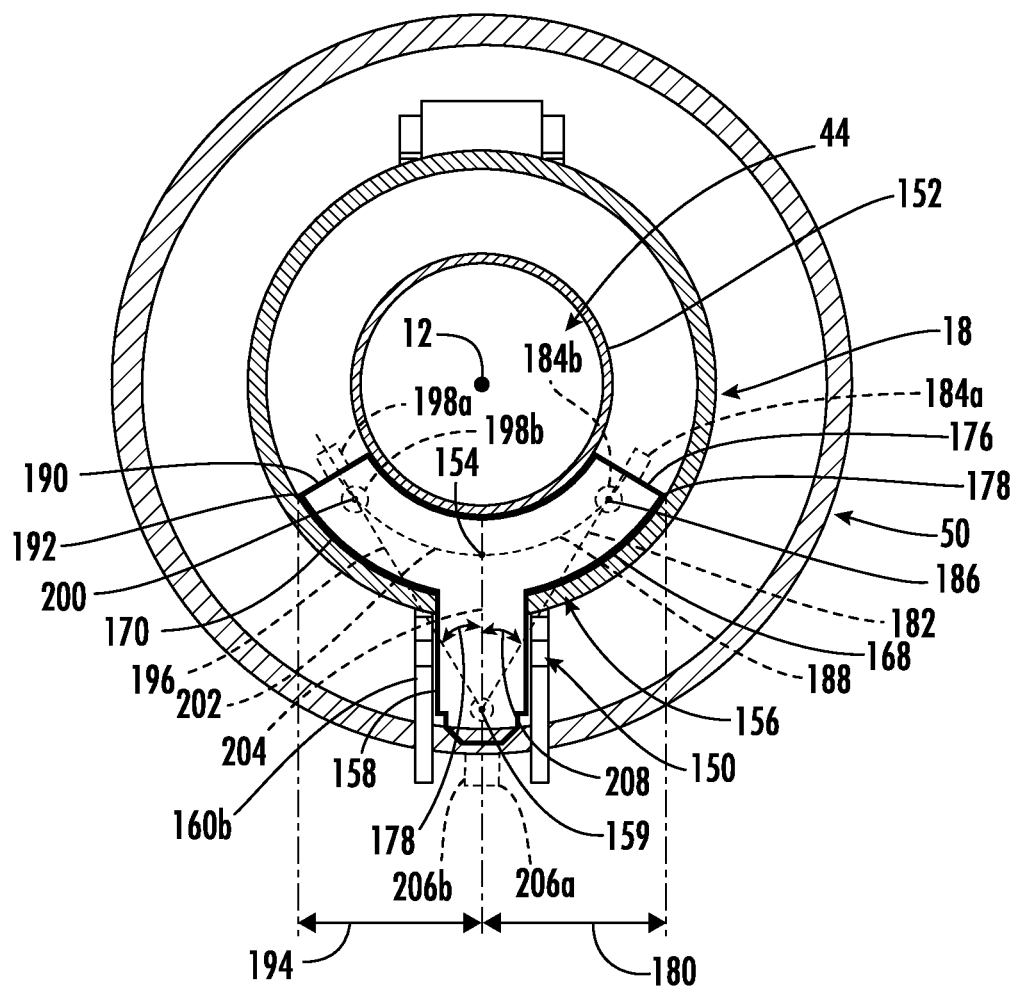
FIG. 11 is an axial view of a portion of the exemplary gas turbine engine of FIG. 9.

Referring now to FIG. 11, FIG. 11 is a cross-section further illustrating the accessory gearbox 150. The cross-section is a schematic cross-section generally taken at an axial location of the first fork 162 (FIG. 10). The engine core 152 is schematically illustrated along with the turbine engine longitudinal centerline 12. A C-shaped or arc cross-section can be defined by the first arm 168 and the second arm 170 and straddle the engine core 152. While no spacing or coupling components are illustrated between the engine core 152 and the accessory gearbox 150, it will be understood that any suitable spacing and components can be included. The first arm 168 extends from the AGB axis 154 to a first terminating point or a first distal surface 176. The first distal surface 176 can have a first end point 178 defined as the point on the first distal surface 176 that is radially farthest from the turbine engine longitudinal centerline 12. A first distance 180 can be measured radially from the AGB axis 154 to the first end point 178.

The first arm 168 can include a first plane 182. The two dimensions defining the first plane 182 are illustrated by way of example as a first dimension that is generally perpendicular to the first distal surface 176 and a second dimension that is into/out of the page. As used herein, the term "generally perpendicular" defines an angle between two objects that is between 80 degrees and 100 degrees (inclusive of the endpoints). Additionally, or alternatively, the first plane 182 can be defined by a plane defined by at least an obtuse angle extending from the yaw or pitch axis (e.g., from into/out of page, or top to bottom respectively in FIG. 9). In FIG. 11, the obtuse angle is formed with a yaw-roll plane. In other examples, the first plane 182 can be defined by rotation around more than one of these three mutually orthogonal axes. It is further contemplated that the first plane 182 can form any angle in either dimension with the first distal surface 176.

A primary set of interfaces 184a, 184b can be operably coupled to or defined by a portion of the first arm 168. The primary set of interfaces 184a, 184b can extend along or be defined by the first plane 182. While illustrated as two interfaces 184a, 184b that lie on the first plane 182, any number of interfaces in the first plane 182, including one, are contemplated.

The first arm 168 can define a first arm axis of rotation 186. It is contemplated that the rotation of an output shaft or other portion of the first arm 168 about the first arm axis of rotation 186 can be considered an interface of the accessory gearbox 150. An interface as defined herein can be an input to the accessory gearbox 150 or an output from the accessory gearbox 150. It is further contemplated that the first arm 168 can define any number of axes of rotations.

The first arm 168 can sweep a first arclength 188 from the AGB axis 154 to the first distal surface 176. The first arm 168 can cover, straddle, or otherwise wrap around between 5% and 50% of the engine core 152. It is contemplated that the length of the first arclength 188 is between 1% and 60% the circumference of the engine core 152.

The second arm 170 extends from the plane of the AGB axis 154 to a second terminating point or a second distal surface 190. The second distal surface 190 can have a second end point 192 defined as the point on the second distal surface 190 that is radially farthest from the turbine engine longitudinal centerline 12. A second distance 194 can be measured radially from the AGB axis 154 to the second end point 192. While illustrated as equal, the first distance 180 can be greater than or less than the second distance 194. That is, the second portion 158 of the accessory gearbox 150 is spaced non-equidistant between the first end point 178 and the second end point 192, where the first end point 178 and the second end point 192 are defined by the arc cross-section.

The second arm 170 can include a second plane 196. The two dimensions defining the second plane 196 are illustrated by way of example as a first dimension that is generally perpendicular to the second distal surface 190 and a second dimension that is into/out of the page. Similar to the first plane 182, the second plane 196 can be defined by a plane defined by at least an obtuse angle extending from the yaw or pitch axis (i.e., from into/out of page, or top to bottom respectively in FIG. 9). It is further contemplated that the second plane 196 can form any angle in either dimension with the second distal surface 190.

A secondary set of interfaces 198a, 198b can be operably coupled to or defined by a portion of the second arm 170. The secondary set of interfaces 198a, 198b can be defined by the second plane 196. While illustrated as two interfaces 198a, 198b that lie on or extend along the second plane 196, any number of interfaces in the second plane 196, including one, are contemplated.

The second arm 170 can define a second arm axis of rotation 200. It is contemplated that the rotation of an output shaft or other portion of the second arm 170 about the second arm axis of rotation 200 can be considered an interface of the accessory gearbox 150. It is further contemplated that the second arm 170 can define any number of axes of rotations.

The second arm 170 can sweep a second arclength 202 from the AGB axis 154 to the second distal surface 190. The second arm 170 can cover or otherwise wrap around between 5% and 50% of the engine core 152. It is contemplated that the length of the second arclength 202 is between 1% and 60% the circumference of the engine core 152. While illustrated as equal, the second arclength 202 can be less than or greater than the first arclength 188.

A third plane 204 can define a tertiary set of interfaces 206a, 206b included in the second portion 158 of the accessory gearbox 150. As illustrated, by way of non-limiting example, the second portion 158 of the accessory gearbox 150 can be generally perpendicular to the AGB axis 154. The tertiary set of interfaces 206a, 206b can extend along the third plane 204. It is contemplated that one or more of the tertiary set of interfaces 206a, 206b extends past an inner surface (along the radial direction R) of the outer nacelle 50. That is, the accessory gearbox 150 can include the primary set of interfaces 184a, 184b defined by the first plane 182, the secondary set of interfaces 198a, 198b defined by the second plane 196, and the tertiary set of interfaces 206a, 206b defined by the third plane 204. Interfaces can include, but are not limited to systems, components, or other engine elements that receive energy from the rotation of the accessory gearbox 150 about the AGB axis 154. It is contemplated that the interfaces 206a, 206b, 184a, 184b, 198a, and 198b can correspond to an interface to service one or more of, or any of an output shaft, fuel pump, transfer gearbox, lubrication pump, air compressor, scavenge pump, electrical generator, fuel control, fuel pump, permanent magnet alternator, lubrication pump, or hydraulic pump. It is further contemplated that the second portion 158 of the accessory gearbox 150 can define any number of axes of rotations, and in the embodiment depicted the second portion 158 defines an axis of rotation 159.

The third plane 204, similar to the first plane 182 and the second plane 196, includes two dimensions illustrated by way of example as a first dimension that is generally perpendicular to the AGB axis 154, extending radially outward from the longitudinal centerline 12, and a second dimension that is into/out of the page. Similar to the first plane 182 and the second plane 196, the third plane 204 can be defined by a plane defined by at least an obtuse angle extending from the yaw or pitch axis (i.e., from into/out of page, or top to bottom respectively in FIG. 9). It is further contemplated that the third plane 204 can form any angle in either dimension with the AGB axis 154.

As shown, by way of example, each of the respective pair of interfaces 206a, 206b, 184a, 184b, 198a, and 198b or axes of rotations 186, 200, 159 associated with the respective planes 182, 196, 204 are generally perpendicular to each other. However, it is contemplated that the angles between the interfaces 206a, 206b, 184a, 184b, 198a, and 198b or the axes of rotations 186, 200, 159 associated with the respective planes 182, 196, 204 can be any angle, including between 50 degrees to 100 degrees.

A first angle 208 can be defined from the third plane 204 to the first plane 182 by a clockwise rotation. As illustrated, the first angle 208 can be an acute angle, however any angle between, but not including, zero degrees and 180 degrees is contemplated. A second angle 210 can be from the third plane 204 to the second plane 196 by a counterclockwise rotation. As illustrated, the first angle 208 can be an acute angle, however any angle between, but not including, zero degrees and 180 degrees is contemplated. While illustrated as equal, it is contemplated that the first angle 208 can be greater than or less than the second angle 210.

It is contemplated that any number of additional planes defining interfaces or axes of rotation can extend from or be defined by the first portion 156 or the second portion 158. It is also contemplated that the additional planes of interfaces or axes of rotation can extend from or be defined by one or more portions of the first plane 182, the second plane 196, the third plane 204, the first arm axis of rotation 186, the second arm axis of rotation 200, the AGB axis 154, the first arclength 188, or the second arclength 202.

In operation, the accessory gearbox 150 is operably coupled to one or more components of the engine core 152. That is, one or more components of the engine core 152 provides or otherwise communicates energy to the accessory gearbox 150. By way of non-limiting example, the accessory gearbox 150 can be powered by energy provided by a drive shaft located in the engine core 152 along the turbine engine longitudinal centerline 12 or the LP shaft 36 (see FIG. 1). Additionally, or alternatively, the accessory gearbox 150 can be electrically driven using electrical power generated by the rotation of the engine core 152 or a storage device for electrical energy.

The accessory gearbox 150, when powered, rotates one or more components about the AGB axis 154. The rotation about the AGB axis 154 can then provide energy in the form of rotational energy or electro-magnetic energy to at least one of the interfaces from the primary set of interfaces 184a, 184b, the secondary set of interfaces 198a, 198b, or the tertiary set of interfaces 206a, 206b. The primary set of interfaces 184a, 184b, the secondary set of interfaces 198a, 198b, and the tertiary set of interfaces 206a, 206b are located in the first plane 182, the second plane 196, and the third plane 204, respectively. The first plane 182, the second plane 196, and the third plane 204 are three distinct planes that can be parallel or intersect.

The transfer of energy from the accessory gearbox 150 to the primary set of interfaces 184a, 184b, the secondary set of interfaces 198a, 198b, and the tertiary set of interfaces 206a, 206b can be from the rotation of a bevel gear arrangement. That is, one or more of the primary set of interfaces 184a, 184b, the secondary set of interfaces 198a, 198b, or the tertiary set of interfaces 206a, 206b can be driven using a system of bevel gears having a shared drive shaft. It is further contemplated that the accessory gearbox 150 can include multiple motors to provide power to hydraulic or electrically driven interfaces.

The tertiary set of interfaces 206a, 206b coupled to or defined by the second portion 158 of the accessory gearbox 150 allow the first portion 156 of the accessory gearbox 150 to be smaller. That is, having the second portion 158 of the accessory gearbox 150 allows the distance between the outer casing 18 and the engine core 152 to decrease. The smaller distance between the outer casing 18 and the engine core 152 can increase the aerodynamics of a bypass airflow duct 56 (see FIG. 9) by decreasing a drag on an airflow therethrough. Additionally, or alternatively, the smaller first portion 156 of the accessory gearbox 150 can provide room for additional components.

The accessory gearbox 150 having the first portion 156 between the engine core 152 and the outer casing 18 and the second portion 158 between the outer casing 18 and the outer nacelle 50 allows for the turbofan engine 10 to include, for example, a slim line nacelle fan cowl and/or advanced thrust reverser assemblies 54 (FIG. 1). In particular, inclusion of the exemplary accessory gearbox 150 may allow for the benefits associated with inclusion of the outlet guide vanes 52 (FIG. 1) in the forward swept configuration to be realized (e.g., a shorter outer nacelle 50, as increased length may not be needed to accommodate a thickness of an entirety of an accessory gearbox located in the outer nacelle 50).

It will be appreciated, however, that the exemplary turbofan engine 10 and accessory gearbox 150 described above with reference to FIG. 9 through 11 is provided by way of example only. In other exemplary embodiments, the turbofan engine 10 and accessory gearbox 150 may have any other suitable configuration.

Figure 12:
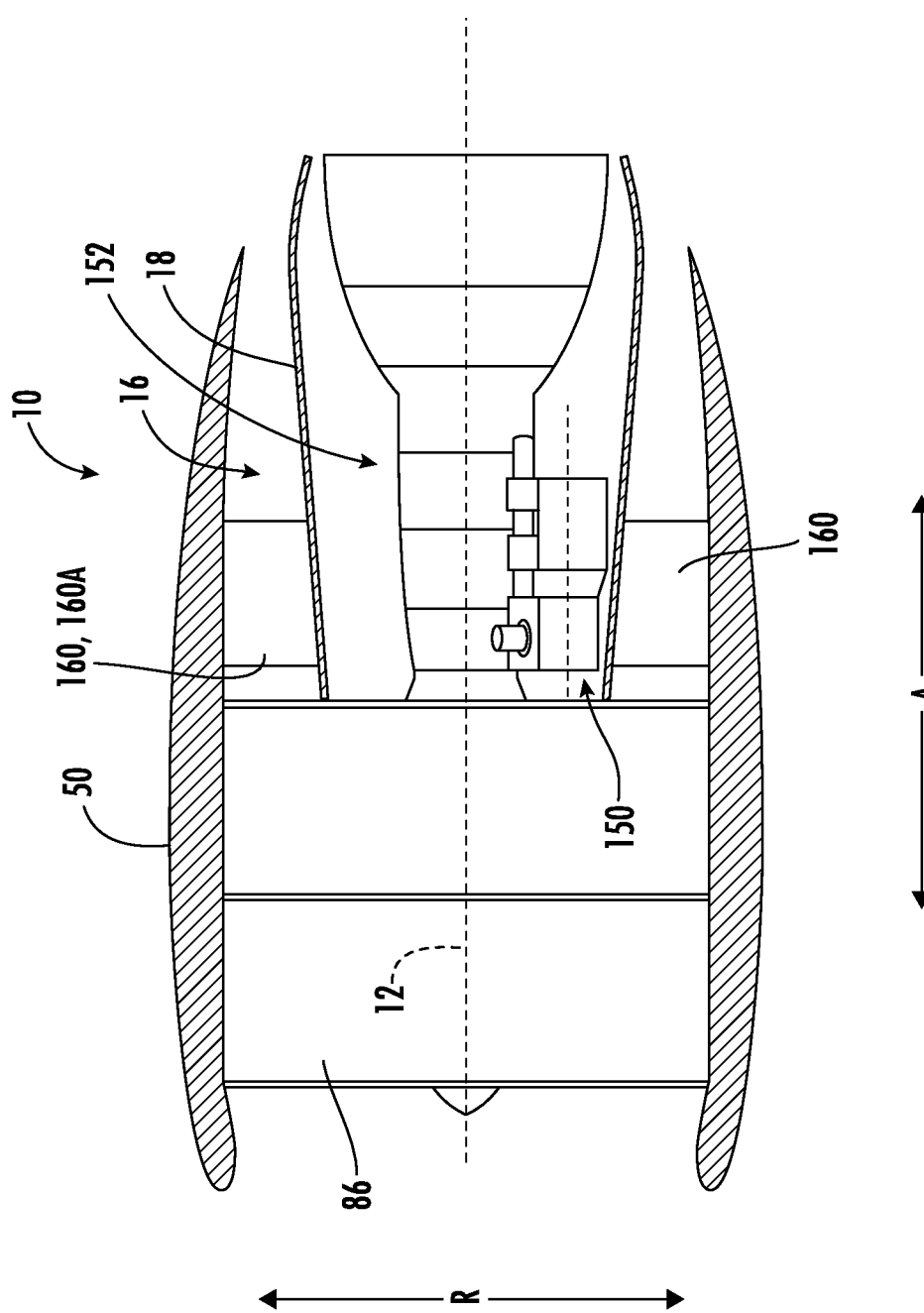
FIG. 12 is a cross-sectional view of a gas turbine engine in accordance with yet another exemplary aspect of the present disclosure.

For example, referring briefly to FIG. 12, a turbofan engine 10 in accordance with another exemplary embodiment of the present disclosure is provided. The exemplary turbofan engine 10 of FIG. 12 is configured in substantially the same manner as the exemplary turbofan engine 10 described above with reference to FIGS. 9 through 11. For example, the exemplary turbofan engine 10 of FIG. 12 includes an accessory gearbox 150. However, for the exemplary embodiment of FIG. 12, the accessory gearbox 150 is positioned entirely within an outer casing 18 of a turbomachine 16 of the turbofan engine 10.

Figure 13:
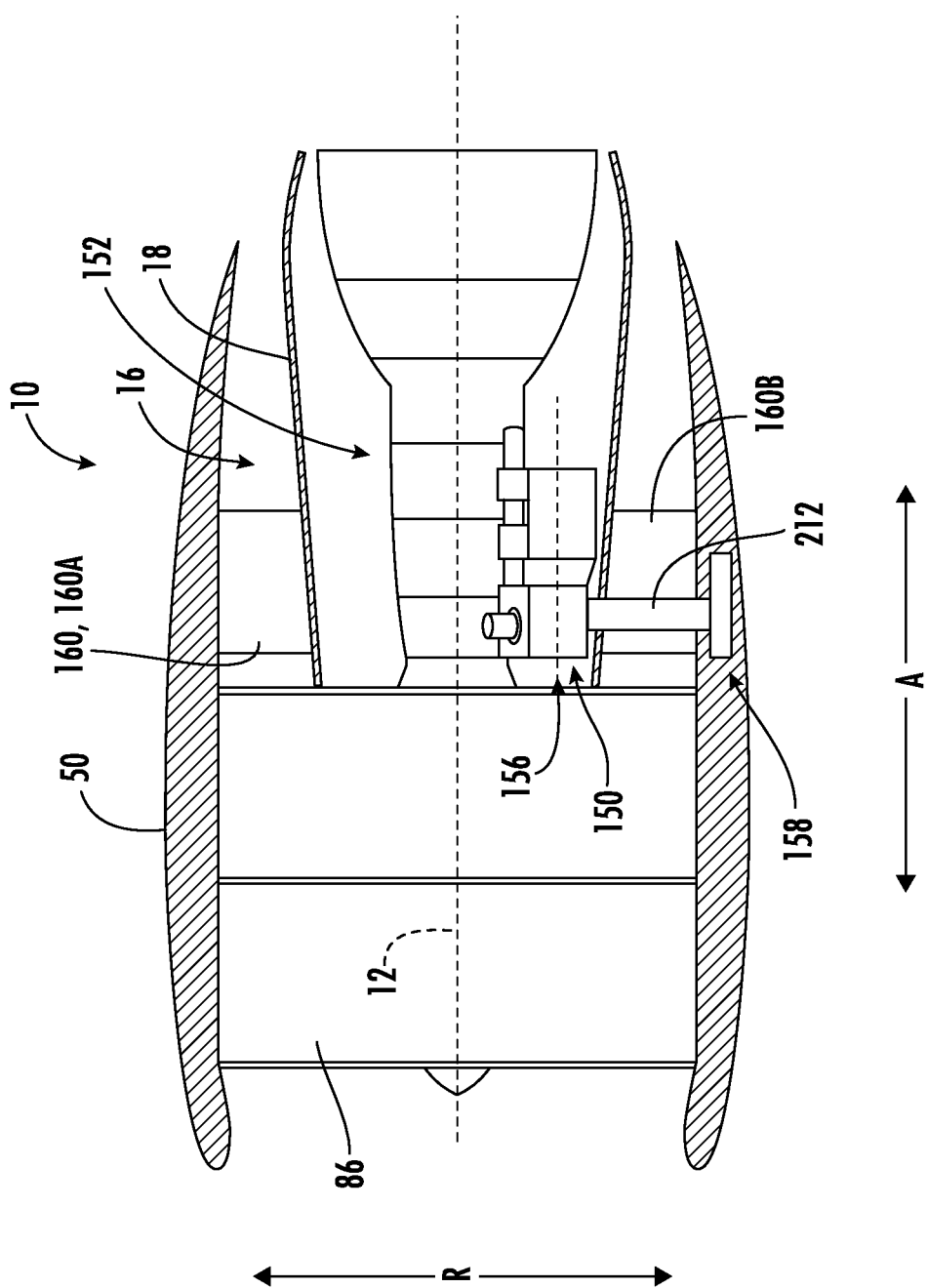
FIG. 13 is a cross-sectional view of a gas turbine engine in accordance with still another exemplary aspect of the present disclosure.

Further by way of example, referring now to FIG. 13, a turbofan engine 10 in accordance with another exemplary embodiment of the present disclosure is provided. The exemplary turbofan engine 10 of FIG. 13 is also configured in a similar manner as the exemplary turbofan engine 10 described above with reference to FIGS. 9 through 11. For example, the exemplary turbofan engine 10 of FIG. 13 includes an accessory gearbox 150. The accessory gearbox 150 includes a first portion 156 and a second portion 158. The first portion 156 is positioned at least partially within an outer casing 18 of a turbomachine 16 of the turbofan engine 10. In particular, for the embodiment shown the first portion 156 is positioned entirely within the outer casing 18 of the turbomachine 16.

However, for the embodiment depicted, the second portion 158 of the accessory gearbox 150 is positioned within an outer nacelle 50 of the turbofan engine 10. Notably, the exemplary accessory gearbox 150 includes a drive assembly 212 extending from the first portion 156 to the second portion 158, mechanically coupling the first portion 156 and the second portion 158 such that the first portion 156 may share rotational power with the second portion 158 (and vice versa). The drive assembly 212 may include a mechanical drive assembly (e.g., a combination of shafts, gears, etc.), a hydraulic drive assembly, or a combination thereof. In particular, for the embodiment depicted, the drive assembly 212 extends into a strut 160 (and more specifically a lower strut 160B) of the engine 100.

The inclusion of accessory gearbox 150 in accordance with one or more the exemplary aspects discussed above in combination with a turbofan engine 10 in accordance with one or more exemplary aspects discussed herein, may allow for an overall shorter turbofan engine 10, improving, e.g., aerodynamics and efficiency for the turbofan engine 10. In particular, by mounting at least a portion of the accessory gearbox 150 within an outer casing 18 of a turbomachine 16 of the turbofan engine 10, contrary to conventional turbofan engine 10 design principles suggesting that the accessory gearbox 150 should be positioned in the outer nacelle 50 for, e.g., more desirable environmental conditions and to save under cowl space on the turbomachine 16, benefits associated with shortening an axial length of the outer nacelle 50 achieved through inclusion of forward swept outlet guide vanes 52 may be realized. In particular, positioning of the accessory gearbox 150 in accordance with the present disclosure may allow for a thinner outer nacelle 50. If the entirety of the accessory gearbox 150 were instead positioned in the outer nacelle 50, the outer nacelle 50 may require include a bulge (e.g., a local increased thickness) that would require additional length to be smoothened out from an aerodynamics standpoint.

Referring now to an additional and/or alternative exemplary configuration of the present disclosure, it will be appreciated that the demand for more aerodynamically efficient and compact turbofan engines remains strong. Turbofan engines are generally designed to have a lower Fan Pressure Ratio (FPR) to produce efficient thrust. The low FPR may result in a reduction in fan flow separation.

One way to achieve a low FPR is to incorporate a reduction gearbox to allow the fan to rotate slower than a drive turbine (e.g., an LP turbine). Such may introduce weight and complexity. Alternatively, the fan may be directly driven by the drive turbine. However, in order to achieve a low FPR, the drive turbine is constrained in how fast it can rotate, which may result in a less efficient drive turbine.

In particular, challenging this previous thinking, the inventors have found that introducing inlet pre-swirl features upstream of the fan blades can address the efficiency and separation challenges associated with high-speed fans. This approach not only enables improved fan performance, but also facilitates the integration of a high-speed booster. Such a booster, in turn, paves the way for a high-speed drive turbine (e.g., the LP turbine) with potential modifications like a reduced rotor stage count and/or an increased radius, which may result in a more compact turbomachine.

Further, incorporating forward-swept OGVs to this arrangement may further allow for a reduction in a length of an outer nacelle of the turbofan engine. Thus, by integrating the forward-swept OGVs with the inlet pre-swirl features, the inventors have found that an overall length of the turbofan engine may be reduced, while also improving aerodynamic performance and engine efficiency.

Notably, the increased speed of the fan may further bolster conventional thinking that the outlet guide vanes should be further spaced from the fan blades of the fan (discouraging incorporation of forward swept OGVs in a turbofan engine with a high speed fan). However, utilizing one or more of the configurations discussed hereinabove, the inventors of the present disclosure have overcome these concerns.

Figure 14:
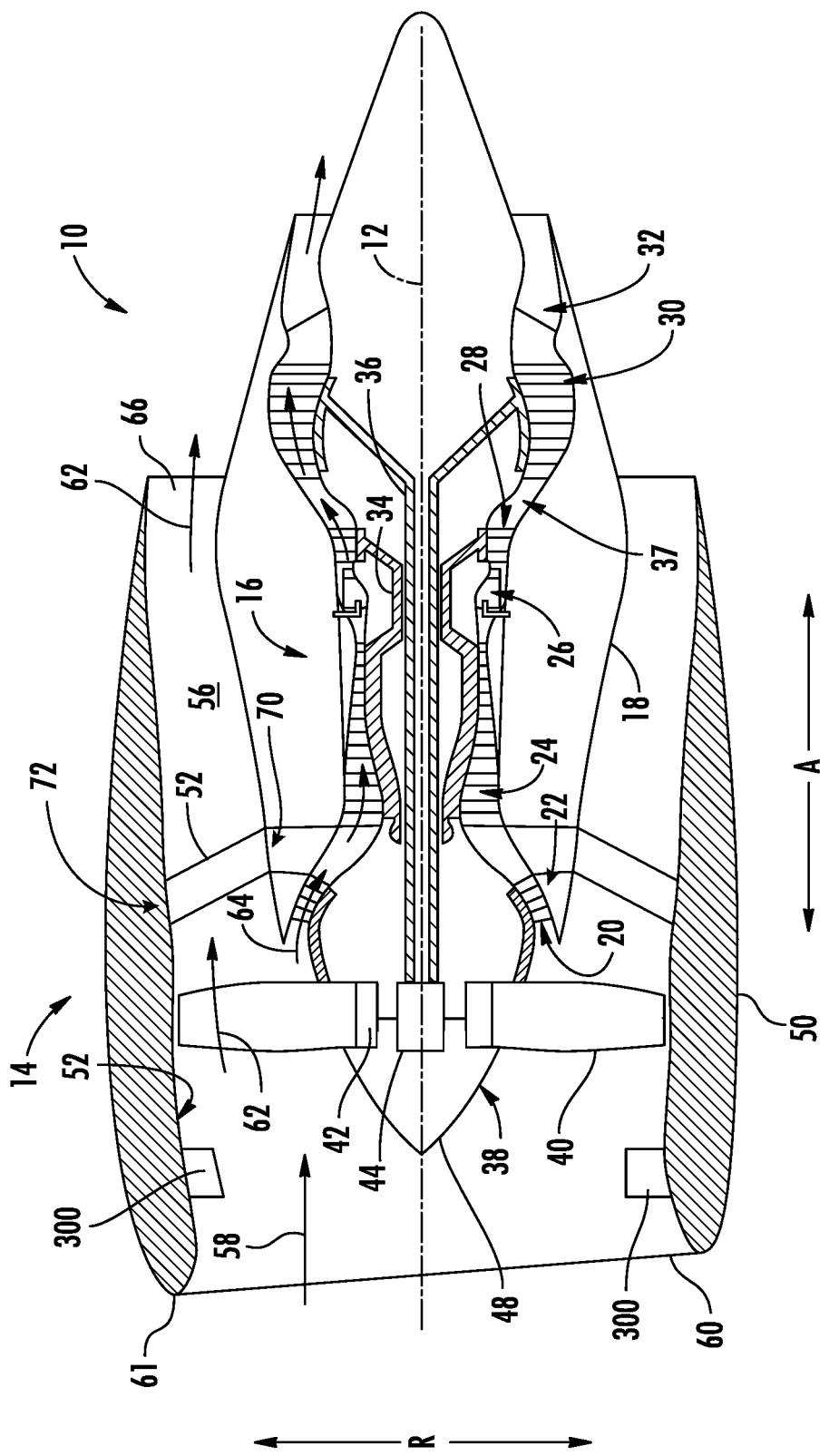
FIG. 14 is a cross-sectional view of a gas turbine engine in accordance with yet another exemplary aspect of the present disclosure.

Referring now to FIG. 14, a turbofan engine 10 in accordance with another exemplary embodiment of the present disclosure is provided. The exemplary turbofan engine 10 of FIG. 14 may be configured in a similar manner as one or more of the exemplary turbofan engines 10 described above. For example, the exemplary turbofan engine 10 of FIG. 14 generally includes a fan section 14 having a fan 38 with a plurality of fan blades 40, a turbomachine 16 drivingly coupled to the fan 38 and having an outer casing 18, and an outer nacelle 50 surrounding the fan 38 at least a portion of the turbomachine 16. Additionally, the exemplary turbofan engine 10 of FIG. 14 further includes an outlet guide vane 52 extending between the turbomachine 16 and the outer nacelle 50 at a location downstream of the fan blades 40 of the fan 38. The outlet guide vane 52 defines a base 70 and a tip 72 and is forward swept from the base 70 to the tip 72. More specifically, the turbofan engine 10 includes a plurality of outlet guide vanes 52 configured in such a manner.

However, it will be appreciated that turbofan engine 10 is configured as a "direct-drive" turbofan engine 10. More specifically, for the embodiment shown, the fan 38 of the fan section 14 is driven by an LP turbine 30 of the turbomachine 16 directly (i.e., the LP turbine 30 rotates at the same rotational speed as the fan 38). In such a manner, it will be appreciated that the fan 38, and an LP compressor 22 rotatable with the fan 38, are configured to rotate at a relatively high rotational speed. In order to reduce an amount of flow separation, e.g., at outer tips of the plurality of fan blades 40 of the fan 38, the turbofan engine 10 of the present disclosure also provides a pre-swirl feature attached to or integrated into the outer nacelle 50 at a location upstream of the plurality of fan blades 40 of the fan 38.

More specifically, for the exemplary embodiment of FIG. 14, the inlet pre-swirl feature is one of a plurality of inlet pre-swirl features attached to or integrated into the outer nacelle 50 at a location upstream of the plurality of fan blades 40, and the plurality of inlet pre-swirl features are each configured as a part span inlet guide vane 300, as described in more detail below.

Briefly, it will be appreciated that by configuring the turbofan engine 10 in such a manner, a benefit associated with including the plurality of outlet guide vanes 52 oriented in a forward swept configuration may be realized. In particular, by having the fan 38 configured in a direct drive configuration with the LP turbine 30, with the plurality of inlet pre-swirl features, the fan 38 and LP turbine 30 may rotate more quickly, allowing for the LP turbine 30 to have a shorter axial length (e.g., a lower number of stages of LP turbine rotor blades and/or a higher radius). In such a manner, an overall length for the turbomachine 16 may be reduced, allowing for a benefit associated with having a reduced length outer nacelle 50 (achieved through the forward swept outlet guide vanes 52), to be realized.

Figure 15:
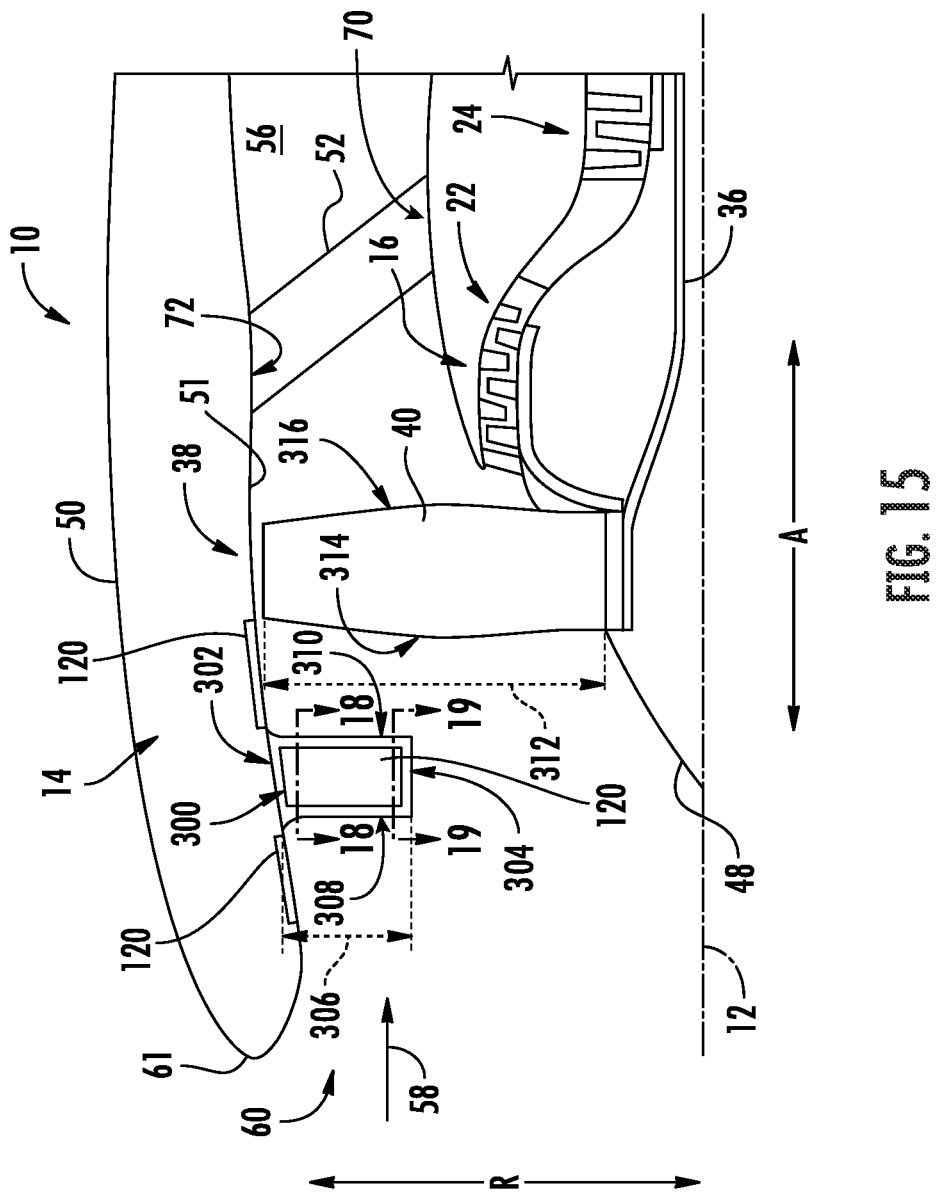
FIG. 15 is a close-up view of a portion of the exemplary gas turbine engine of FIG. 14.

Notably, referring now also to FIG. 15, providing a close-up, schematic view of the fan section 14 and forward end of the turbomachine 16 of the exemplary turbofan engine 10 of FIG. 14, for the embodiment depicted the turbofan engine 10 further includes one or more acoustic treatments 120 coupled to or integrated into the part span inlet guide vanes 300, an inner wall 51 of the outer nacelle 50, or both. In particular, for the embodiment depicted, the turbofan engine 10 includes a plurality of acoustic treatments 120 coupled to or integrated into the part span inlet guide vanes 300 (e.g., on a pressure or suction side), the inner wall 51 of the outer nacelle 50 forward of the part span inlet guide vanes 300, and the inner wall 51 of the outer nacelle 50 aft of the part span inlet guide vanes 300 (and upstream of the plurality of fan blades 40). Such a configuration may further assist with attenuation of noise associated with the forward swept outlet guide vanes 52.

Referring still to FIG. 15, in the embodiment depicted, the plurality of part span inlet guide vanes 300 are each cantilevered from the outer nacelle 50 (such as from the inner wall 51 of the outer nacelle 50) at a location forward of the plurality of fan blades 40 of the fan 38 along the axial direction A and aft of an inlet 60 of the outer nacelle 50. More specifically, each of the plurality of part span inlet guide vanes 300 defines an outer end 302 along the radial direction R, and are attached to/connected to the outer nacelle 50 at the radially outer end 302 through a suitable connection means (not shown). For example, each of the plurality of part span inlet guide vanes 300 may be bolted to the inner wall 51 of the outer nacelle 50 at the outer end 302, welded to the inner wall 51 of the outer nacelle 50 at the outer end 302, or attached to the outer nacelle 50 in any other suitable manner at the outer end 302.

Further, for the embodiment depicted, the plurality of part span inlet guide vanes 300 extend generally along the radial direction R from the outer end 302 to an inner end 304 (i.e., an inner end 304 along the radial direction R). Moreover, as will be appreciated, for the embodiment depicted, each of the plurality of part span inlet guide vanes 300 is unconnected with an adjacent part span inlet guide vane 300 at the respective inner ends 304 (i.e., adjacent part span inlet guide vanes 300 do not contact one another at the radially inner ends 304, and do not include any intermediate connection members at the radially inner ends 304, such as a connection ring, strut, etc.). More specifically, for the embodiment depicted, each part span inlet guide vane 300 is completely supported by a connection to the outer nacelle 50 at the respective outer end 302 (and not through any structure extending, e.g., between adjacent part span inlet guide vanes 300 at a location inward of the outer end 302 along the radial direction R). Such a configuration may reduce an amount of turbulence generated by the part span inlet guide vanes 300.

Moreover, as depicted, each of the plurality of part span inlet guide vanes 300 does not extend completely between the outer nacelle 50 and, e.g., the hub 48 of the turbofan engine 10. More specifically, for the embodiment depicted, each of the plurality of inlet guide vane defines an inlet guide vane ("IGV") span 306 along the radial direction R, and further each of the plurality of part span inlet guide vanes 300 also defines a leading edge 308 and a trailing edge 310. The IGV span 306 refers to a measure along the radial direction R between the outer end 302 and the inner end 304 of the part span inlet guide vane 300 at the leading edge 308 of the part span inlet guide vane 300. Similarly, the plurality of fan blades 40 of the fan 38 define a fan blade span 312 along the radial direction R. More specifically, each of the plurality of fan blades 40 of the fan 38 also defines a leading edge 314 and a trailing edge 316, and the fan blade span 312 refers to a measure along the radial direction R between a radially outer tip and a base of the fan blade 40 at the leading edge 314 of the respective fan blade 40.

For the embodiment depicted, the IGV span 306 is at least about five percent of the fan blade span 312 and less than or equal to about fifty-five percent of the fan blade span 312. For example, in certain exemplary embodiments, the IGV span 306 may be between about fifteen percent of the fan blade span 312 and about forty-five percent of the fan blade span 312, such as between about thirty percent of the fan blade span 312 and about forty percent of the fan blade span 312.

Figure 16:
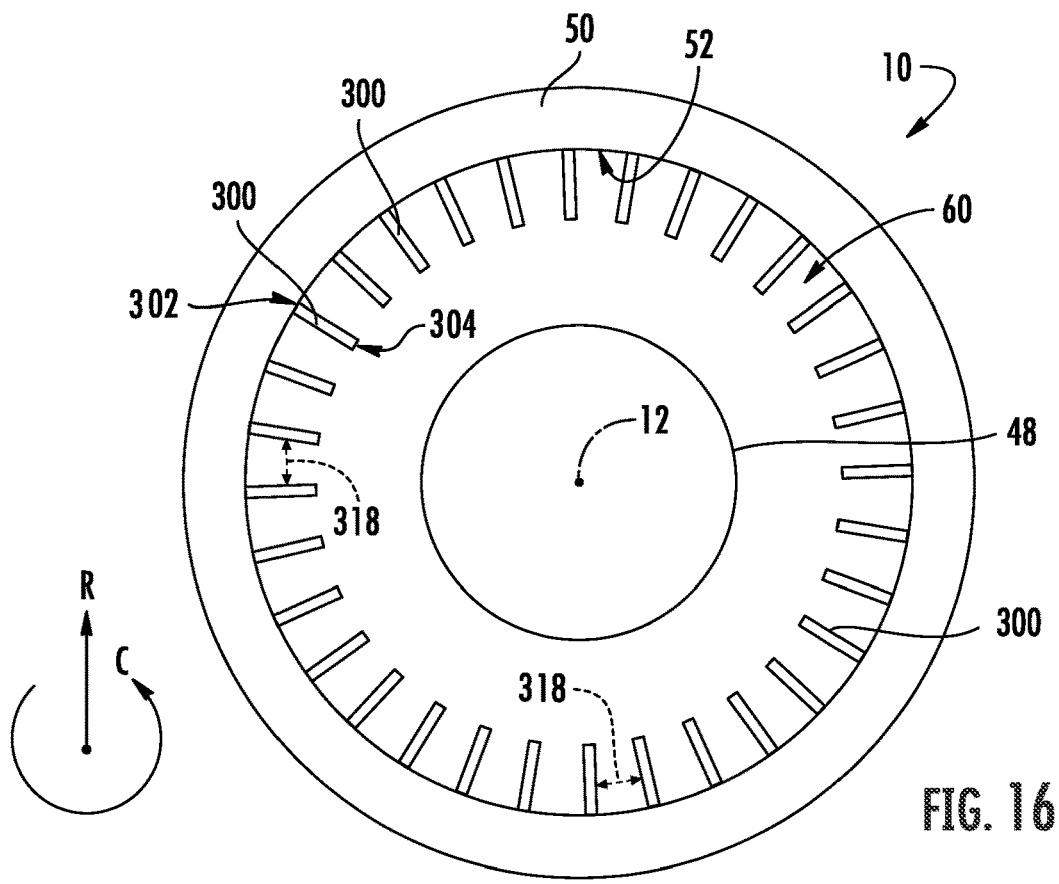
FIG. 16 is an axial view of a gas turbine engine in accordance with yet an exemplary aspect of the present disclosure.

Reference will now also be made to FIG. 16, providing an axial view of the inlet 60 to the turbofan engine 10 of FIGS. 14 and 15. As will be appreciated, for the embodiment depicted, the plurality of part span inlet guide vanes 300 of the turbofan engine 10 includes a relatively large number of part span inlet guide vanes 300. More specifically, for the embodiment depicted, the plurality of part span inlet guide vanes 300 includes between about ten part span inlet guide vanes 300 and about fifty part span inlet guide vanes 300. More specifically, for the embodiment depicted, the plurality of part span inlet guide vanes 300 includes between about twenty part span inlet guide vanes 300 and about forty-five part span inlet guide vanes 300, and more specifically, still, the embodiment depicted includes thirty-two part span inlet guide vanes 300. Additionally, for the embodiment depicted, each of the plurality of part span inlet guide vanes 300 is spaced substantially evenly along a circumferential direction C of the turbofan engine 10. More specifically, each of the plurality of part span inlet guide vanes 300 defines a circumferential spacing 318 with an adjacent part span inlet guide vane 300, with the circumferential spacing 318 being substantially equal between each adjacent part span inlet guide vane 300.

Although not depicted, in certain exemplary embodiments, the number of part span inlet guide vanes 300 may be equal to the number of fan blades 40 of the fan 38 of the turbofan engine 10. In other embodiments, however, the number of part span inlet guide vanes 300 may be greater than the number of fan blades 40 (FIG. 15) of the fan 38 (FIG. 15) of the turbofan engine 10, or alternatively, may be less than the number of fan blades 40 of the fan 38 of the turbofan engine 10.

Figure 17:
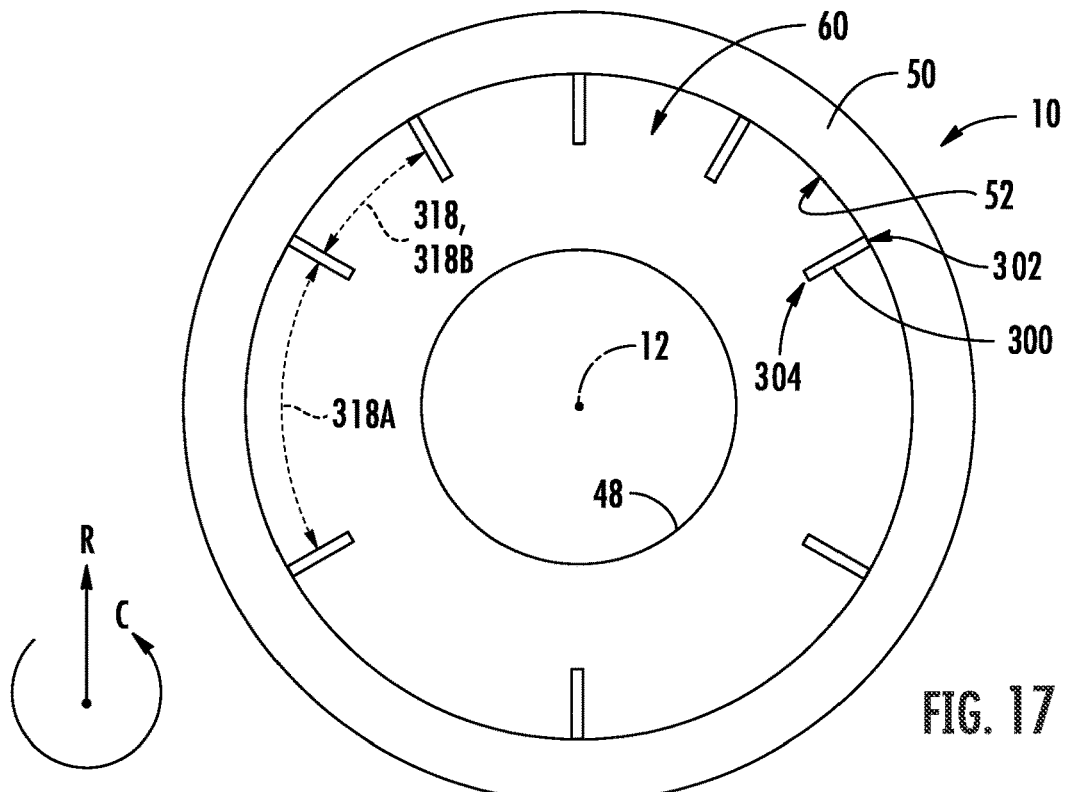
FIG. 17 is an axial view of a gas turbine engine in accordance with yet another exemplary aspect of the present disclosure.

Further, it should be appreciated, that in other exemplary embodiments, the turbofan engine 10 may include any other suitable number of part span inlet guide vanes 300 and/or circumferential spacing 318 of the part span inlet guide vanes 300. For example, referring now briefly to FIG. 17, an axial view of an inlet 60 to a turbofan engine 10 in accordance with another exemplary embodiment of the present disclosure is provided. For the embodiment of FIG. 17, the turbofan engine 10 includes less than twenty part span inlet guide vanes 300. More specifically, for the embodiment of FIG. 17, the turbofan engine 10 includes at least eight part span inlet guide vanes 300, or more specifically includes exactly eight part span inlet guide vanes 300. Additionally, for the embodiment of FIG. 17 the plurality of part span inlet guide vanes 300 are not substantially evenly spaced along the circumferential direction C. For example, at least certain of the plurality of part span inlet guide vanes 300 defines a first circumferential spacing 318A, while other of the plurality of part span inlet guide vanes 300 defines a second circumferential spacing 318B. For the embodiment depicted, the first circumferential spacing 318A is at least about twenty percent greater than the second circumferential spacing 318B, such as at least about twenty-five percent greater such as at least about thirty percent greater, such as less than or equal to about two hundred percent greater. Notably, the circumferential spacing 318 refers to a mean circumferential spacing between adjacent part span inlet guide vanes 300. The non-uniform circumferential spacing may, e.g., offset structure upstream of the part span inlet guide vanes 300.

Referring now back to FIG. 15, each of the plurality of part span inlet guide vanes 300 is configured to pre-swirl an airflow 58 provided through the inlet 60 of the outer nacelle 50, upstream of the plurality of fan blades 40 of the fan 38. As discussed herein, pre-swirling the airflow 58 provided through the inlet 60 of the outer nacelle 50 prior to such airflow 58 reaching the plurality of fan blades 40 of the fan 38 may reduce separation losses and/or shock losses, allowing the fan 38 to operate with the relatively high fan tip speeds described above with less losses in efficiency.

Figure 18:
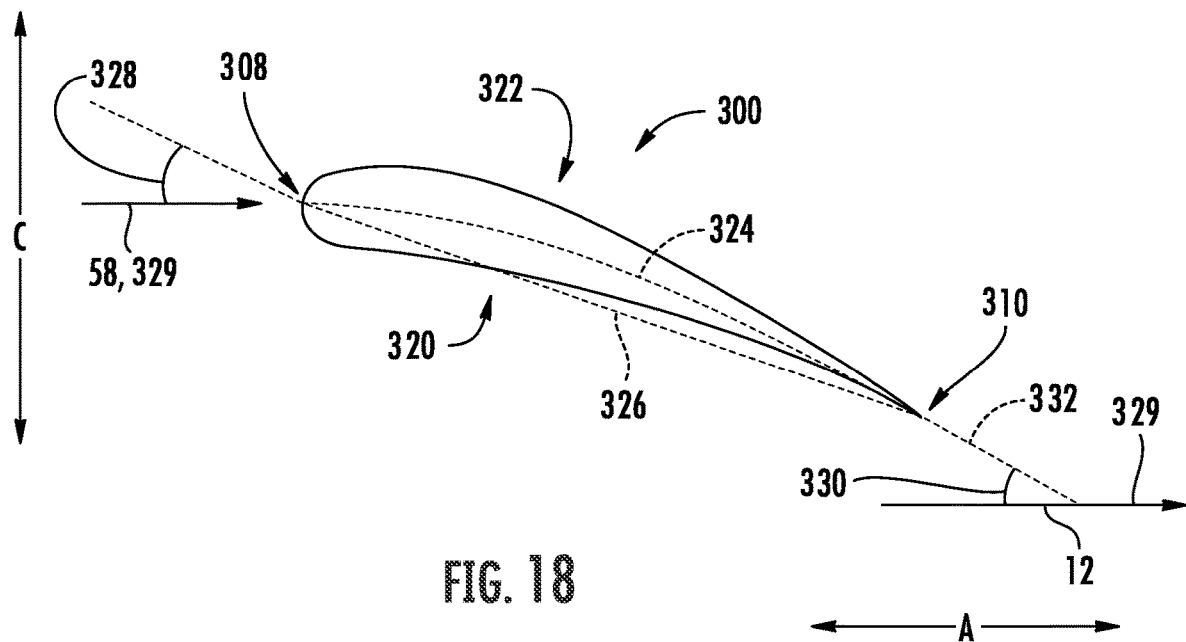
FIG. 18 is a first cross-sectional view of an inlet pre-swirl feature depicted in FIGS. 14 and 15.

For example, referring first to FIG. 18, a cross-sectional view of one part span inlet guide vane 300 along the span of the part span inlet guide vanes 300, as indicated by Line 18-18 in FIG. 15, is provided. As is depicted, the part span inlet guide vane 300 is configured generally as an airfoil having a pressure side 320 and an opposite suction side 322, and extending between the leading edge 308 and the trailing edge 310 along a camber line 324. Additionally, the part span inlet guide vane 300 defines a chord line 326 extending directly from the leading edge 308 to the trailing edge 310. The chord line 326 of the part span inlet guide vane 300 defines an angle of attack 328 with respect to the longitudinal centerline 12 of the outer nacelle 50 (see, also, FIG. 15). For example, the chord line 326 defines an angle of attack 328 with an airflow direction 329 of the airflow 58 through the inlet 60 of the nacelle 50. Notably, for the embodiment depicted, the airflow direction 329 is substantially parallel to the axial direction A and the longitudinal centerline 12 of the outer nacelle 50 of the turbofan engine 10. For the embodiment depicted, the angle of attack 328 at the location depicted along the IGV span 306 of the part span inlet guide vanes 300 is at least approximately five degrees and less than or equal to approximately thirty-five degrees. For example, in certain embodiments, the angle of attack 328 at the location depicted along the IGV span 306 of the part span inlet guide vane 300 may be between about ten degrees and about thirty degrees, such as between about fifteen degrees and about twenty-five degrees.

Additionally, the part span inlet guide vane 300, at the location depicted along the IGV span 306 of the part span inlet guide vane 300 defines a local swirl angle 330 at the trailing edge 310. The "swirl angle" at the trailing edge 310 of the part span inlet guide vane 300, as used herein, refers to an angle between the airflow direction 329 of the airflow 58 through the inlet 60 of the outer nacelle 50 and a reference line 332 defined by a trailing edge section of the pressure side 320 of the part span inlet guide vane 300. More specifically, the reference line 332 is defined by the aft twenty percent of the pressure side 320, as measured along the chord line 326. Notably, when the aft twenty percent the pressure side 320 defines a curve, the reference line 332 may be straight-line average fit of such curve (e.g., using least mean squares).

Further, a maximum swirl angle 330 refers to the highest swirl angle 330 along the IGV span 306 of the part span inlet guide vane 300. For the embodiment depicted, the maximum swirl angle 330 is defined proximate the radially outer end 302 of the part span inlet guide vane 300 (e.g., at the outer ten percent of the IGV span 306 of the part span inlet guide vanes 300), as is represented by the cross-sectional view depicted in FIG. 18. For the embodiment depicted, the maximum swirl angle 330 of each part span inlet guide vane 300 at the trailing edge 310 is between approximately five degrees and approximately thirty-five degrees. For example, in certain exemplary embodiments, the maximum swirl angle 330 of each part span inlet guide vane 300 at the trailing edge 310 may be between twelve degrees and twenty-five degrees.

Figure 19:
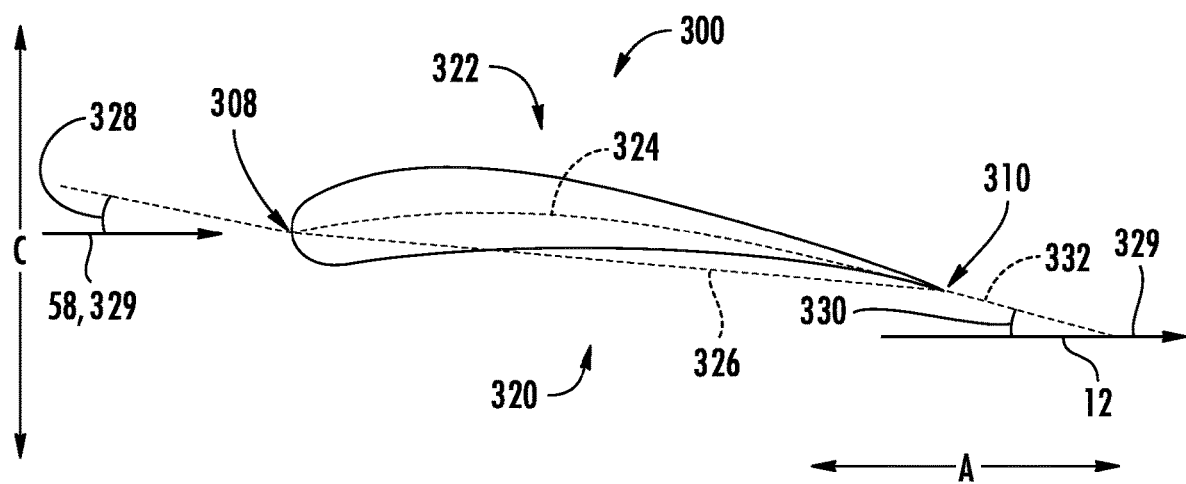
FIG. 19 is a second cross-sectional view of the inlet pre-swirl feature depicted in FIGS. 14 and 15.

Moreover, for the embodiment of FIGS. 15, 16, and 18, the local swirl angle 330 increases from the radially inner end 304 to the radially outer end 302 of each part span inlet guide vane 300. For example, referring now also to FIG. 19, a cross-sectional view of a part span inlet guide vane 300 at a location radially inward from the cross-sectional view in FIG. 18, as indicated by Line 19-19 in FIG. 15, is provided. As is depicted in FIG. 19, and as stated above, the part span inlet guide vane 300 defines the pressure side 320, the suction side 322, the leading edge 308, the trailing edge 310, the camber line 324, and the chord line 326. Further, the angle of attack 328 defined by the chord line 326 and the airflow direction 329 of the airflow 58 through the inlet 60 of the outer nacelle 50 at the location along the IGV span 306 depicted in FIG. 19 is less than the angle of attack 328 at the location along the IGV span 306 depicted in FIG. 18 (e.g., may be at least about twenty percent less, such as at least about fifty percent less, such as less than or equal to about one hundred percent less). Additionally, the part span inlet guide vane 300 defines a local swirl angle 330 at the trailing edge 310 at the location along the IGV span 306 of the part span inlet guide vane 300 proximate the inner end 304, as depicted in FIG. 19. As stated above, the local swirl angle 330 increases from the radially inner end 304 to the radially outer end 302 of each part span inlet guide vanes 300. Accordingly, the local swirl angle 330 proximate the outer end 302 (see FIG. 18) is greater than the local swirl angle 330 proximate the radially inner end 304 (see FIG. 19; e.g., the radially inner ten percent of the IGV span 306). For example, the local swirl angle 330 may approach zero degrees (e.g., may be less than about five degrees, such as less than about two degrees) at the radially inner end 304.

Notably, including part span inlet guide vanes 300 of such a configuration may reduce an amount of turbulence at the radially inner end 304 of each respective part span inlet guide vane 300. Additionally, such a configuration may provide a desired amount of pre-swirl at the radially outer ends of the plurality of fan blades 40 of the fan 38 (where the speed of the fan blades 40 is the greatest) to provide a desired reduction in flow separation and/or shock losses that may otherwise occur due to a relatively high speed of the plurality of fan blades 40 at the fan tip 72s during operation of the turbofan engine 10.

Figure 20:
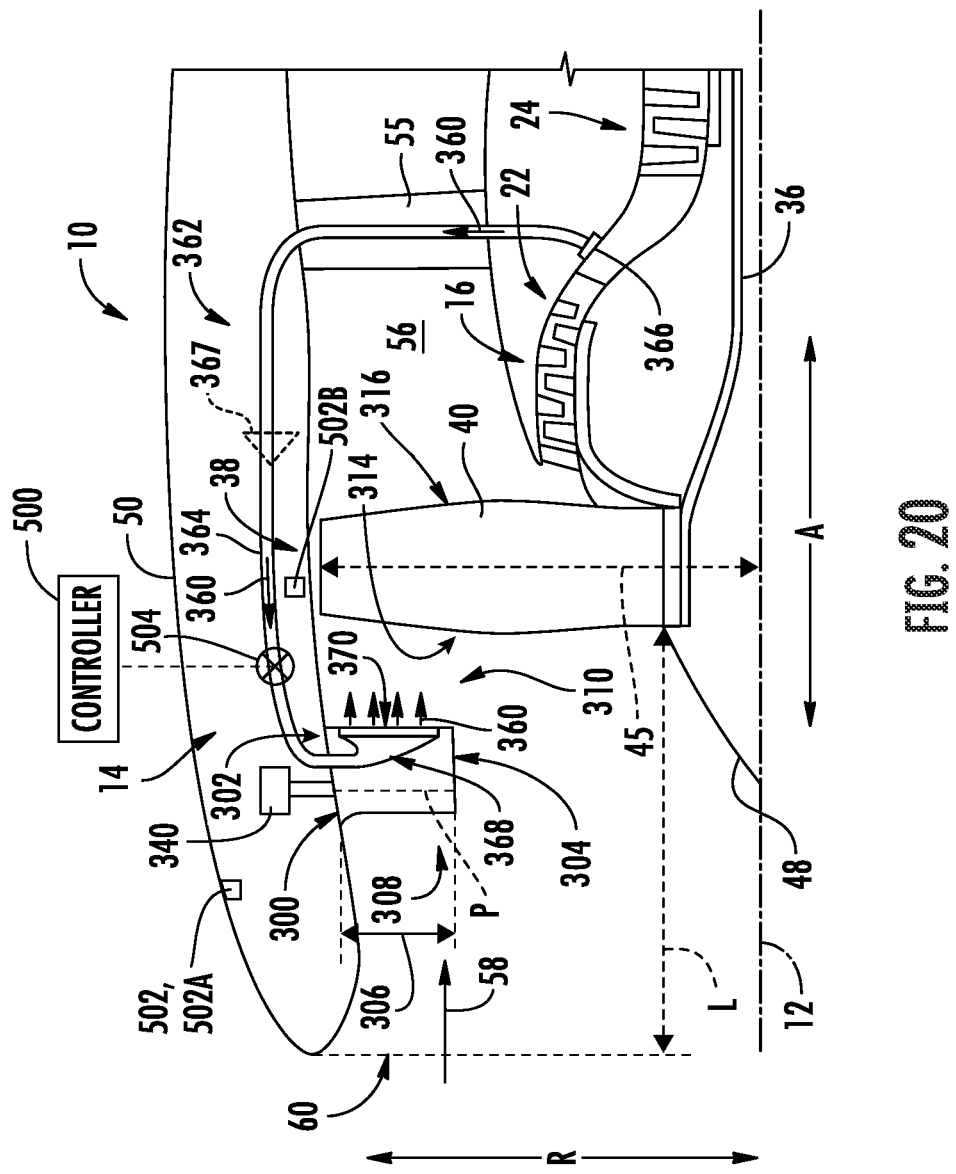
FIG. 20 is a close-up view of a portion of a gas turbine engine in accordance with yet another exemplary aspect of the present disclosure.

Referring now to FIG. 20, a close-up, schematic view of a fan section 14 and forward end of a turbomachine 16 of a turbofan engine 10 in accordance with another exemplary embodiment of the present disclosure is provided. The exemplary turbofan engine 10 of FIG. 20 may be configured in a similar manner as the exemplary turbofan engine 10 of FIGS. 14 through 16 and 18 through 19.

For the exemplary embodiment of FIG. 20, the turbofan engine 10 further includes a variable pitch mechanism 340 that is in communication with the inlet pre-swirl feature, e.g., configured as the plurality of part span inlet guide vanes 300. The variable pitch mechanism 340 is configured to transition the inlet pre-swirl feature, e.g., configured as the plurality of part span inlet guide vanes 300, between a first angle with respect to a longitudinal centerline 12 of turbofan engine 10 and a second angle with respect to the longitudinal centerline 12 of the turbofan engine 10. In such a manner, it will be appreciated that each of the plurality of part span inlet guide vanes 300 defines a pitch axis P about which it is configured to rotate. It is contemplated that the variable pitch mechanism 340 may include, for example, a stepper motor, a torque motor, or similar drive component.

In such a manner, each of the part span inlet guide vanes 300 of the present disclosure is transitionable between the first angle with respect to the longitudinal centerline 12 of the outer nacelle 50 and the second angle, e.g., an angle of attack 328 or a local swirl angle 330, with respect to the longitudinal centerline 12 of the outer nacelle 50, wherein the first angle and the second angle are different. The first angle may be similar to the angle depicted in the embodiment of FIG. 18 (e.g., the angle of attack 328 or the local swirl angle 330), and the second angle may be similar to the angle depicted in the embodiment of FIG. 19 (e.g., the angle of attack 328 or the local swirl angle 330; when the same part span inlet guide vane 300 is viewed at the same location along its span).

In other words, an angle of the part span inlet guide vanes 300 of the present disclosure can be varied during operation of the turbofan engine 10. In certain exemplary embodiments it is contemplated that the second angle is at least about 2% greater/less than the first angle. In other exemplary embodiments, it is contemplated that the second angle is at least about 5% greater/less than the first angle. In other exemplary embodiments, it is contemplated that the second angle is at least about 30% greater/less than the first angle.

In the present disclosure, the angle of the part span inlet guide vanes 300 may be variable in order to, e.g., match the swirl imparted to the incoming air to the airspeed of the aircraft and the rotational speed of the fan 38 such that the angular velocity of the air as it approaches the fan blade 40 corresponds more closely with an angular velocity of the fan blade 40. This may reduce a potential of the fan 38 to surge/stall. The faster the fan 38 rotates, the more swirl that needs to be imparted by the part span inlet guide vanes 300. As the airspeed of the aircraft increases, the time that it takes for the incoming air to pass from the part span inlet guide vanes 300 to the leading edge 314 of the fan 38 decreases, and as such the necessary amount of swirl decreases proportionately. As such, a maximum imparted swirl may be required when the turbofan engine 10 is at a maximum thrust with a stationary aircraft, just prior to beginning a takeoff operation.

For example, each of the part span inlet guide vanes 300 of the present disclosure could transition from a higher angle (FIG. 18) to a lower angle (FIG. 19; when viewed at a common location along a span of the part span inlet guide vane 300) during operation of the turbofan engine 10. Furthermore, each of the part span inlet guide vanes 300 of the present disclosure could transition from a lower angle (FIG. 18) to a higher angle (FIG. 19; when viewed at a common location along a span of the part span inlet guide vane 300) during operation of the turbofan engine 10.

Referring still to FIG. 20, in exemplary embodiments, the plurality of part span inlet guide vanes 300 may further be configured to provide a compensation airflow 360 to a trailing edge 310 of the plurality of part span inlet guide vanes 300 to minimize a wake of the part span inlet guide vanes 300 and/or to address crosswind concerns for the turbofan engine 10.

For example, as in other embodiments of the present disclosure, in order to realize a benefit achievable through inclusion of the plurality of outlet guide vanes 52 configured in the forward swept configuration, the turbofan engine 10 further includes a relatively short inlet. In particular, the outer nacelle 50 defines an inlet length L and the fan 38 defines a fan diameter D (equal to twice a fan radius 45). The ratio of the inlet length L to the fan diameter D is less than or equal to 0.5 in the embodiment shown. In such a manner, the inlet of the outer nacelle 50 may be less capable of straightening out a crosswind experienced by the turbofan engine 10 during certain operating conditions (e.g., taxi and takeoff). In certain exemplary embodiments, the plurality of inlet guide vanes 300 may assist with addressing crosswind concerns of the turbofan engine 10 by, e.g., varying a pitch of one or more of the plurality of part span inlet guide vanes 300, introducing compensation airflow 360 through one or more of the plurality of part span inlet guide vanes 300, or both.

In particular, the exemplary turbofan engine 10 of FIG. 20 includes a compensation air supply assembly 362, which generally includes a compensation air supply duct 364 defining an inlet 366 in airflow communication with the high pressure air source. For the embodiment depicted, the high pressure air source is a compressor section of the turbomachine 16 of the turbofan engine 10. For example, the compensation air supply duct 364 may be configured to receive bleed air from the compressor section.

Notably, however, in other embodiments, the compensation air supply duct 364 may instead receive high pressure air from any other suitable high pressure air source. For example, in other exemplary embodiments, the high pressure air source may instead be the bypass airflow duct 56 at a location downstream of the plurality of fan blades 40 of the fan 38. Additionally, in one or more these embodiments, the compensation air supply assembly 362 may further include an air compressor 367 (depicted in phantom) configured to increase a pressure of the compensation airflow 360 through the compensation air supply duct 364.

Further, although the compensation air supply duct 364 is depicted as a single, continuous, and separate compensation air supply duct 364, in other embodiments, the composition air supply duct 364 may have any other suitable configuration. For example, the compensation air supply duct 364 may be formed of a plurality of sequential ducts, may be formed integrally with other components of the turbofan engine 10, and/or may be split off into a plurality of parallel airflow ducts to provide compensation airflow 360 to each of the plurality of part span inlet guide vanes 300.

Further, the compensation air supply duct 364 extends through at least one of the plurality of part span inlet guide vanes 300, and provides a cavity 368 of the part span inlet guide vane 300 with the high pressure composition airflow 360. As is depicted, each of the plurality of part span inlet guide vanes 300 for the embodiment depicted further defines a trailing edge opening 370, which is in airflow communication with the cavity 368, and thus is in airflow communication with the compensation air supply duct 364 of the compensation air supply assembly 362. Accordingly, with such a configuration, the high pressure composition airflow 360 may be provided from the compensation air supply assembly 362 to the cavity 368 of the part span inlet guide vane 300, and further through the trailing edge opening 370 of the part span inlet guide vane 300 during operation of the turbofan engine 10 to, e.g., reduce a wake formed by the respective part span inlet guide vane 300, address crosswind issues experienced by the turbofan engine 10, assist with pre-swirling activities, etc.

Although described as a "cavity", in other embodiments the cavity 368 may be configured as any suitable opening or passage within the part span inlet guide vane 300 to allow a flow of air therethrough. Additionally, in other exemplary embodiments, the plurality of part span inlet guide vanes 300 may instead include any other suitable manner of pneumatically reducing the wake of the respective part span inlet guide vanes 300. For example, in other exemplary embodiments, the trailing edge opening 370 of each part span inlet guide vane 300 may instead be configured as, e.g., a plurality of trailing edge of openings 370 spaced, e.g., along a span 306 of the respective part span inlet guide vane 300 at the trailing edge 310.

Figure 21:
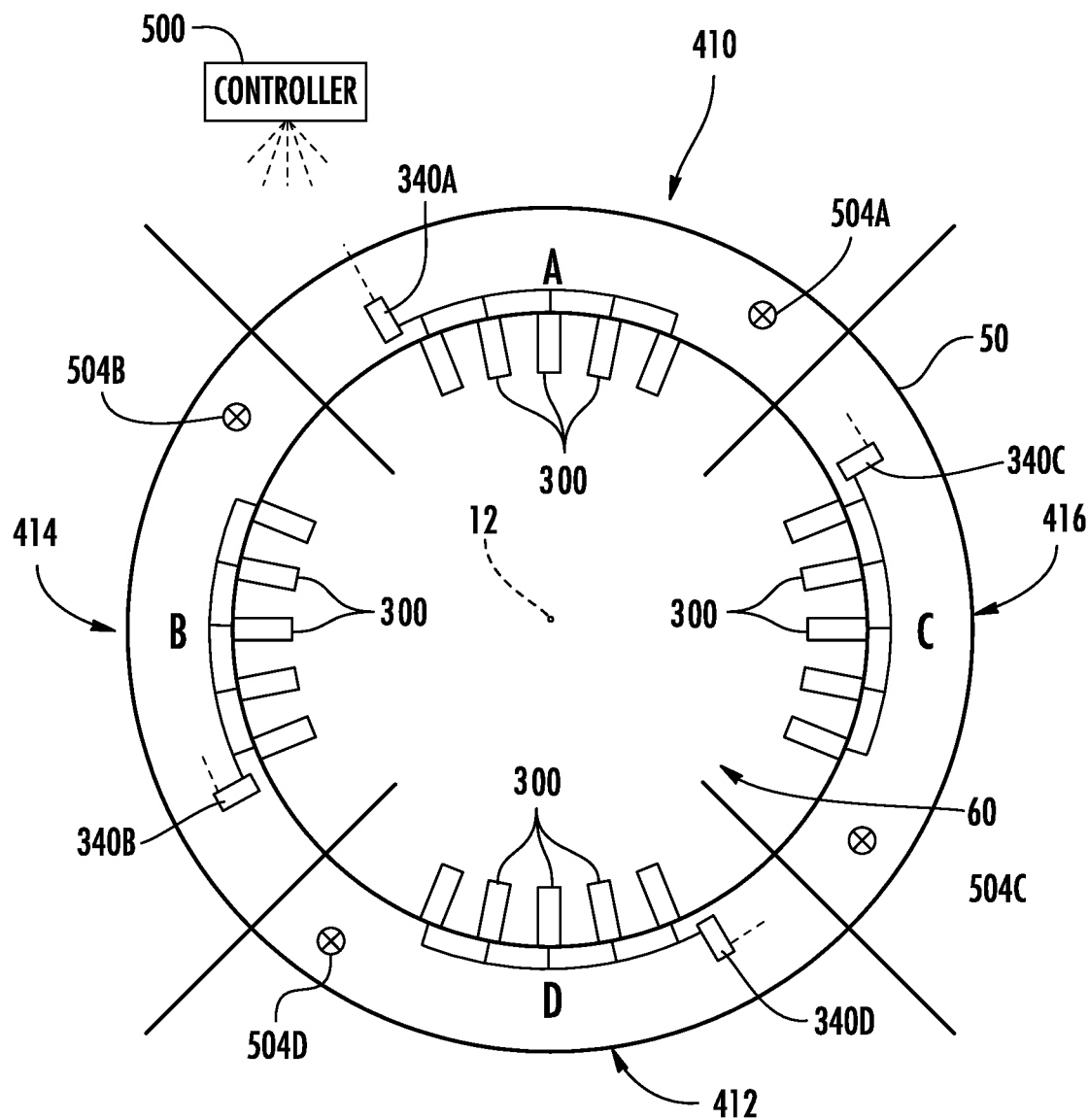
FIG. 21 is an axial view of a gas turbine engine in accordance with yet another exemplary aspect of the present disclosure.

Referring still to FIG. 20 and now also to FIG. 21, FIG. 21 provides an axial view of the inlet 60 to the turbofan engine 10 of FIG. 20. In the exemplary embodiment depicted, the outer nacelle 50 includes a top portion 410, a bottom portion 412, a first side portion 414, and a second side portion 416. In such an embodiment, the plurality of part span inlet guide vanes 300 in the top portion 410 are in sector A, the plurality of part span inlet guide vanes 300 in the first side portion 414 are in sector B, the plurality of part span inlet guide vanes 300 in the second side portion 416 are in sector C, and the plurality of part span inlet guide vanes 300 in the bottom portion 412 are in sector D. Furthermore, in such an exemplary embodiment, the transitioning of an angle of the part span inlet guide vanes 300, with respect to the longitudinal centerline 12 in each sector A, B, C, and D, is separately controlled.

In particular, for the exemplary embodiment depicted, the turbofan engine 10 further includes a first pitch change mechanism 340A operably coupled to the plurality of part span inlet guide vanes 300 in sector A, a second pitch change mechanism 340B operably coupled to the plurality of part span inlet guide vanes 300 in sector B, a third pitch change mechanism 340C operably coupled to the plurality of part span inlet guide vanes 300 in section C, and a fourth pitch change mechanism 340D operably coupled to the plurality of part span inlet guide vanes 300 in sector D.

Each of the plurality of pitch change mechanisms 340A, 340B, 340C, 340D is in operable communication with a controller 500 of the turbofan engine 10. In such a manner, the controller 500 is configured to control one or more of the plurality of pitch change mechanisms 340A, 340B, 340C, 340D independently, such that the plurality of part span the guide vanes 300 in at least one of sectors A, B, C, or D may be independently controlled relative to the plurality of part span guide vanes 300 in at least one of sectors A, B, C, or D. For example, the plurality of part span inlet guide vanes 300 may generally include a first part span inlet guide vane 300 (e.g., a first pre-swirl feature) located in sector B transitional between a first angle and a second angle with respect to the longitudinal centerline 12 (see, e.g., FIGS. 18 and 19, when viewed at a common location along a span of the first part span inlet guide vane 300). The plurality of part span inlet guide vanes 300 may further include a second part span inlet guide vane 300 (e.g., a second pre-swirl feature) located in sector C transitional between a third angle and a fourth angle with respect to the longitudinal centerline 12 of the turbofan engine 10 (see, e.g., FIGS. 18 and 19, when viewed at a common location along a span of the second part span inlet guide vane 300). The first part span inlet guide vane 300 and second part span inlet guide vane 300 may be independently controlled by the controller 500 (e.g., through the pitch change mechanisms 340B, 340C).

For example, an aircraft engine inlet 60 is exposed to the atmosphere, and to wind conditions that may be from any direction. Furthermore, since the turbofan engine 10 is typically shielded on the side that is closer to a fuselage of the aircraft, the wind conditions may be stronger on a side that is away from the fuselage of the aircraft. The aircraft may also be subject to up/downdrafts. As the wind can generally be expected to blow in a singular direction across the face of the engine 10, each of the part span inlet guide vanes 300 may be at a different angle with respect to the wind. As such the effect of a cross wind on the incoming air is a function of the angle of the part span inlet guide vane 300 with respect to the cross wind. It is desirable to impart a swirl to the incoming air that accounts for the cross wind velocity at the particular clock position of the individual part span inlet guide vanes 300. As such individualized control of the angle of the part span inlet guide vanes 300 is desirable.

Notably, the issue of crosswind may be enhanced by virtue of the short inlet (L/D less than 0.5) of the turbofan engine 10 depicted.

As the complexity of the part span inlet guide vane control system increases, the weight of the system increases, which has an effect on the total engine/aircraft efficiency. Therefore, it may be desirable to group the part span inlet guide vanes 300 into clusters to minimize the weight of the total system, while still being able to control the angle of the part span inlet guide vanes 300 of differing sectors of the inlet, such as left and right sectors B and C, respectively, or top and bottom sectors A and D, respectively.

Referring still to FIGS. 20 and 21, it will be appreciated that the turbofan engine 10 further includes one or more sensors 502 configured to sense data indicative of a condition of the turbofan engine 10, such as a condition of the plurality of fan blades 40. The condition of the turbofan engine 10 may be a forward speed of the turbofan engine 10, a crosswind experience by the inlet 60 to the turbofan engine 10, etc. The condition of the plurality of fan blades 40 may be a rotational speed of the plurality of fan blades 40, a position of the plurality of fan blades 40 (along the circumferential direction C), etc. In particular, for the embodiment of FIG. 20, the turbofan engine 10 includes a first sensor 502A, which may be a crosswind sensor configured to sense data indicative of a crosswind experience by the turbofan engine 10, such as by the inlet 60 of the turbofan engine 10, and a second sensor 502B configured as a blade passing sensor configured to sense data indicative of a rotational speed and/or of a position of the plurality of fan blades 40. The first sensor 502A and the second sensor 502B are operably coupled to the controller 500 for providing data to the controller 500.

In certain exemplary aspects, the controller 500 may be configured to receive input data indicating the condition of the plurality of fan blades 40, a condition of the turbofan engine 10, or both, and in response to the data control one or more aspects of the plurality of part span inlet guide vanes 300.

For example, in one exemplary embodiment, in response to the received data, the controller 500 may be configured to control a pitch of the plurality of part span the guide vanes 300. Controlling the pitch of the plurality of part span inlet guide vanes 300 may include varying a pitch of a first part span inlet guide vane 300 relative to a second part span inlet guide vane 300. For example, such exemplary aspect may include controlling one of the plurality of pitch change mechanisms 340A, 340B, 340C, 340D relative to one or more of the remaining pitch change mechanisms 340A, 340B, 340C, 340D (see FIG. 21).

Further for example, in another exemplary embodiment, in response to the received data, the controller 500 may be configured to modulate a high-pressure airflow through the openings at the trailing edges 370 of the plurality of part span inlet guide vanes 300. Briefly, as is depicted schematically in FIG. 20, the turbofan engine 10 may include one or more valves 504 operably coupled to the controller 500 allowing for such a modulation. Moreover, referring now briefly to FIG. 21, the turbofan engine 10 may have a plurality of valves 504 operably coupled to the controller 500 allowing for such a modulation. In particular, the turbofan engine 10 depicted schematically includes a first valve 504A, a second valve 504B, a third valve 504C, and a fourth valve 504D.

Notably, in certain exemplary aspects, modulating the high-pressure airflow through the openings 370 at the trailing edges 310 of the plurality of part span inlet guide vanes 300 may include modulating the high-pressure airflow through a first opening 370 at a first trailing edge 310 of a first part span the guide vane 300 relative to a high-pressure airflow through a second opening 370 at a second trailing edge 310 of a second part span of the guide vane 300. For example, as is depicted schematically in FIG. 21, the turbofan engine 10 may include a first valve 504A fluidly connecting the high pressure air source to the plurality of part span inlet guide vanes 300 in sector A, a second valve 504B fluidly connecting the high pressure air source to the plurality of part span inlet guide vanes 300 in sector B, a third valve 504C fluidly connecting the high pressure air source to the plurality of part span inlet guide vanes 300 in sector C, and a fourth valve 504D fluidly connecting the high pressure air source to the plurality of part span inlet guide vanes 300 in sector D. With such exemplary aspect, modulating the airflow may include controlling one or more of the valves 504A, 504B, 504C, 504D relative to one or more of the remaining valves 504A, 504B, 504C, 504D (see FIG. 21).

Figure 22:
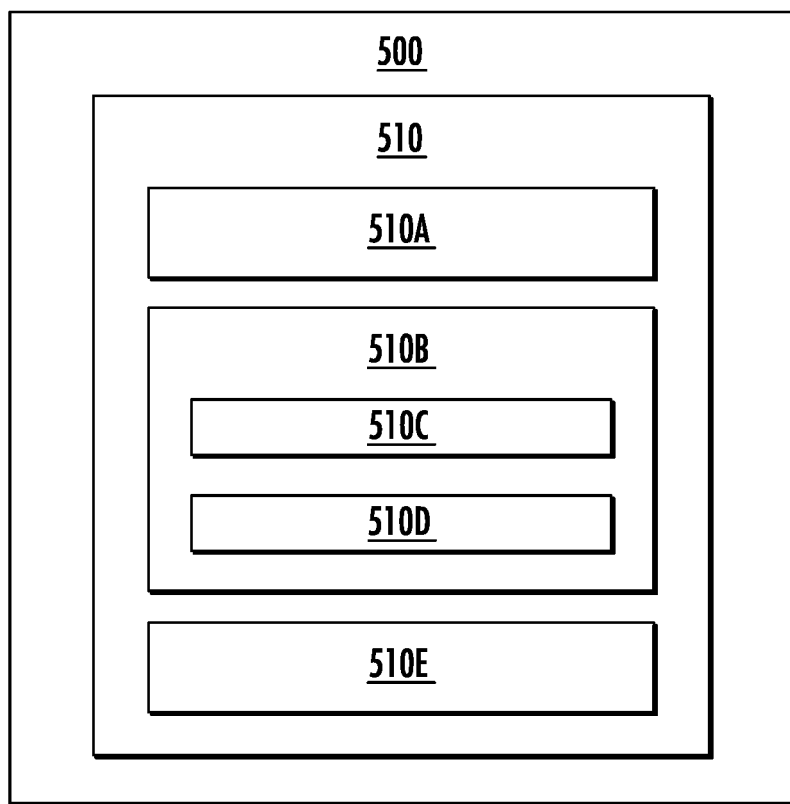
FIG. 22 is a schematic view of a controller in accordance with an exemplary embodiment of the present disclosure.

As noted, the exemplary controller 500 depicted in FIG. 22 is configured to receive the data sensed from various data sources, such as one or more sensors 502 (FIG. 20) (e.g., sensors 502A, 502B for the embodiment shown) and, e.g., may make control decisions for the turbofan engine 10 (FIG. 20) based on the received data.

In one or more exemplary embodiments, the controller 500 depicted in FIG. 22 may be a stand-alone controller 500 for the turbofan engine 10, or alternatively, may be integrated into one or more other controllers for the turbofan engine 10, a controller for an aircraft including the turbofan engine 10, etc.

Referring particularly to the operation of the controller 500, in at least certain embodiments, the controller 500 can include one or more computing device(s) 510. The computing device(s) 510 can include one or more processor(s) 510A and one or more memory device(s) 510B. The one or more processor(s) 510A can include any suitable processing device, such as a microprocessor, microcontroller, integrated circuit, logic device, and/or other suitable processing device. The one or more memory device(s) 510B can include one or more computer-readable media, including, but not limited to, non-transitory computer-readable media, RAM, ROM, hard drives, flash drives, and/or other memory devices.

The one or more memory device(s) 510B can store information accessible by the one or more processor(s) 510A, including computer-readable instructions 510C that can be executed by the one or more processor(s) 510A. The instructions 510C can be any set of instructions that when executed by the one or more processor(s) 510A, cause the one or more processor(s) 510A to perform operations. In some embodiments, the instructions 510C can be executed by the one or more processor(s) 510A to cause the one or more processor(s) 510A to perform operations, such as any of the operations and functions for which the controller 500 and/or the computing device(s) 510 are configured, the operations for turbofan engine 10, as described herein, and/or any other operations or functions of the one or more computing device(s) 510. The instructions 510C can be software written in any suitable programming language or can be implemented in hardware. Additionally, and/or alternatively, the instructions 510C can be executed in logically and/or virtually separate threads on the one or more processor(s) 510A. The one or more memory device(s) 510B can further store data 510D that can be accessed by the one or more processor(s) 510A. For example, the data 510D can include data indicative of power flows, data indicative of engine/aircraft operating conditions, and/or any other data and/or information described herein.

The computing device(s) 510 can also include a network interface 510E used to communicate, for example, with the other components of the turbofan engine 10. For example, in the embodiment depicted, as noted above, the turbofan engine includes one or more sensors 502 for sensing data indicative of one or more parameters of the turbofan engine 10. The controller 500 is operably coupled to the one or more sensors 502 through, e.g., the network interface, such that the controller 500 may receive data indicative of various operating parameters sensed by the one or more sensors 502 during operation. Further, for the embodiment shown the controller 500 is operably coupled to, e.g., the pitch change mechanism(s) 340, the valve(s) 504, etc. In such a manner, the controller 500 may be configured to control the pitch change mechanism(s) 340, the valve(s) 504, etc. in response to, e.g., the data sensed by the one or more sensors 502.

The network interface 510E can include any suitable components for interfacing with one or more network(s), including for example, transmitters, receivers, ports, controllers, antennas, and/or other suitable components.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Referring now to an additional and/or alternative exemplary configuration of the present disclosure, it will be appreciated that the demand for more aerodynamically efficient and compact turbofan engines remains strong. Turbofan engines have traditionally sought to relatively evenly distribute compression loads between a booster (also referred to as an LP compressor) and a high pressure compressor (HP compressor), aiming for operational balance.

However, the inventors of the present disclosure have found that pursuing this balance may lead to certain constraints. For example, previous configurations have relied on a reduction gearbox to moderate fan speeds while allowing a drive turbine, such as a low pressure turbine (LP turbine), and the booster to rotate more quickly. Such a configuration allows for the booster to contribute more significantly to an overall compression of a compressor section of the turbofan engine. While effective, this approach might result in underutilized turbine efficiency.

In a departure from this norm, the inventors of the present disclosure have found an advantage associated with leveraging a high pressure ratio (PR) core/HP compressor, in combination with a reduction gearbox positioned between the LP turbine and the booster such that the booster may rotate more slowly than the LP turbine. This strategic arrangement may allow for the HP compressor to provide a more substantial portion of the overall compression of the compressor section of the turbofan engine. Consequently, more work may then be extracted by a high pressure turbine (HP turbine), thereby reducing a burden on the LP turbine. The inclusion of a geared connection between the LP turbine and the booster/LP compressor also allows for the LP turbine to rotate more quickly, potentially allowing for a reduction in rotor stage count and/or an expansion in the LP turbine's radius to reduce an overall length of the turbomachine of the turbofan engine.

Further, incorporating forward-swept OGVs to this arrangement may further allow for a reduction in a length of an outer nacelle of the turbofan engine. Thus, by integrating the forward-swept OGVs with the above configuration, the inventors have found that an overall length of the turbofan engine may be reduced, while also improving aerodynamic performance and engine efficiency.

Figure 23:
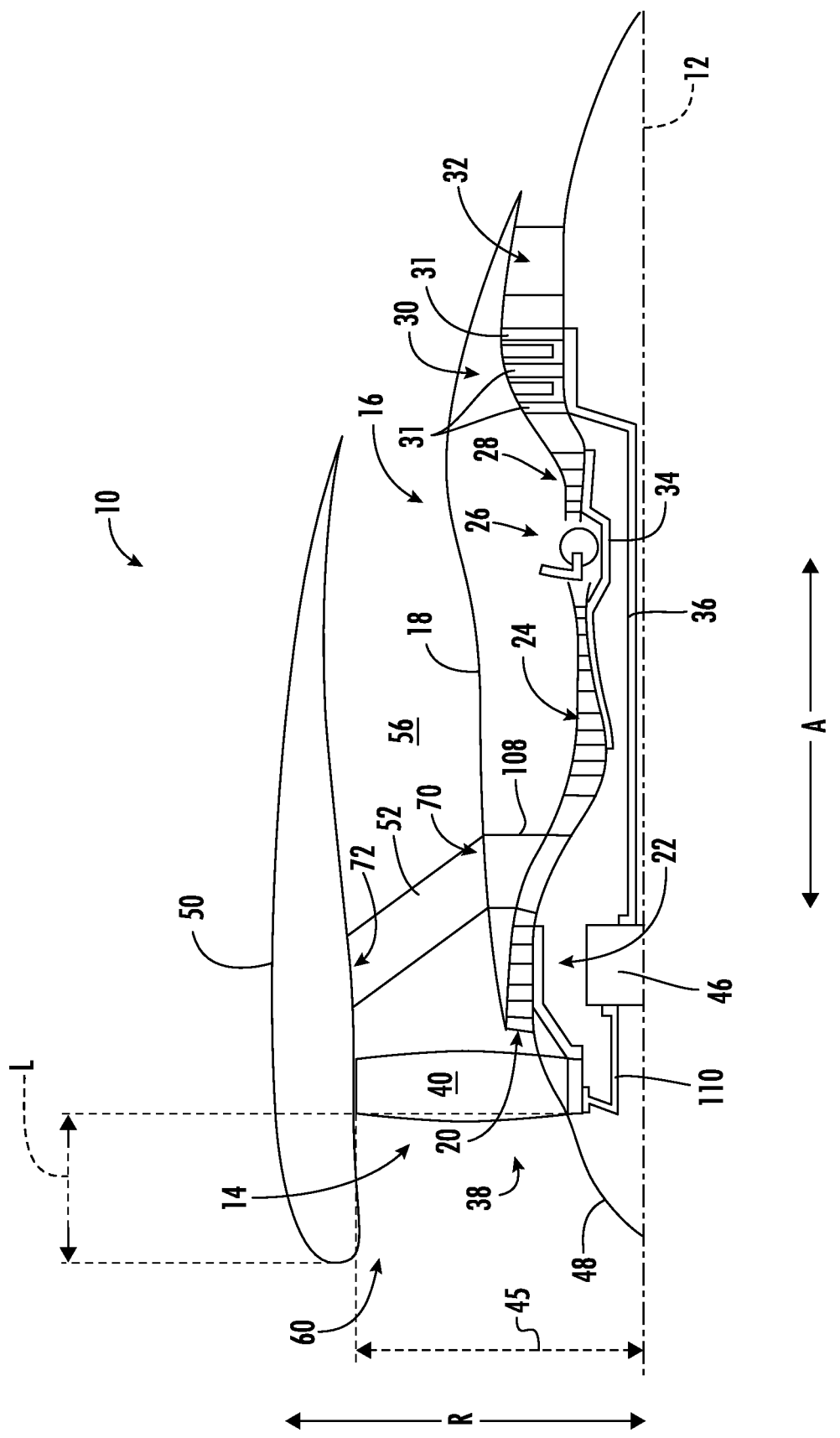
FIG. 23 is a cross-sectional view of a gas turbine engine in accordance with yet another exemplary aspect of the present disclosure.

Referring now to FIG. 23, a turbofan engine 10 in accordance with another exemplary embodiment of the present disclosure is provided. The exemplary turbofan engine 10 of FIG. 23 may be configured in a similar manner as one or more of the exemplary turbofan engines 10 described above, and the same or similar numbering refers to the same or similar parts.

For example, the exemplary turbofan engine 10 of FIG. 23 generally includes a fan section 14 having a fan 38 with a plurality of fan blades 40, a turbomachine 16 drivingly coupled to the fan 38 and having an outer casing 18, and an outer nacelle 50 surrounding the fan 38 and at least a portion of the turbomachine 16. Further, the exemplary turbofan engine 10 includes an outlet guide vane 52 extending between the turbomachine 16 and the outer nacelle 50 at a location downstream of the plurality of fan blades 40. The outlet guide vane 52 defines a base 70 and a tip 72 and is forward swept from the base 70 to the tip 72. More specifically, the turbofan engine 10 includes a plurality of outlet guide vanes 52 configured in such a manner.

Further, the exemplary turbofan engine 10 of FIG. 23 includes a shortened inlet. More specifically, the outer nacelle 50 defines an inlet length L and the fan 38 defines a fan diameter D (equal to twice a fan radius 45). A ratio of the inlet length L to the fan diameter D is less than or equal to 0.5.

In such a manner, will be appreciated that the outer nacelle 50 may define a relatively short axial length, particularly in view of the outlet guide vanes 52 being forward swept from the respective base(es) 70 to the respective tip(s) 72.

Further, the turbomachine 16 of FIG. 23 is arranged in a manner to also allow for a shortened overall length of the turbomachine 16 for the size of the turbofan engine 10. In particular, the exemplary turbomachine 16 includes a compressor section having an LP compressor 22 and an HP compressor 24, a combustion section 26, and a turbine section having an HP turbine 28 and an LP turbine 30.

The turbomachine 16 further includes a power gearbox 46 (also referred to as a reduction gearbox). For the embodiment depicted, the LP turbine 30 is drivingly coupled to the LP compressor 22 across the power gearbox 46. More specifically, the turbomachine 16 includes an LP shaft 36 rotatable with the LP turbine 30 and a fan shaft 110 rotatable with the fan 38. The fan shaft 110 is driven by the LP shaft 36 across the power gearbox 46, and the LP compressor 22 is driven by the fan 38. In such manner, it will be appreciated that the LP compressor 22 is directly rotatable with the fan 38 (e.g., the LP compressor 22 rotates at the same rotational speed as the fan 38).

Such a configuration allows for a beneficial packaging of the power gearbox 46. In particular, for the embodiment depicted, the power gearbox 46 is aligned with the LP compressor 22 along the longitudinal centerline 12, and more specifically is aligned with a downstream-most stage of LP compressor rotor blades of the LP compressor 22 along the longitudinal centerline 12. Moreover, it will be appreciated that such a configuration allows for the LP compressor 22 to be moved forward, and accordingly for an inter-compressor frame 108 of the turbomachine 16 to be moved forward. Accordingly, it will further be appreciated from the view of FIG. 23 that the base 70 of the outlet guide vane 52 is coupled to the inter-compressor frame 108 and is aligned with the inter-compressor frame 108 along the longitudinal centerline 12. Such configuration may provide for more direct support of the outlet guide vane 52.

Further, with such configuration, an aft side of the power gearbox 46 overlaps with the inter-compressor frame 108 of the turbomachine 16. Such a configuration may provide for a more compact compressor section.

Further, it will be appreciated that with such configuration the LP compressor 22 may rotate at a relatively low rotational speed, and thus may define a relatively low LP compressor pressure ratio PRLPC. Accordingly, for the embodiment depicted, the HP compressor 24 is configured to define a relatively high HP compressor pressure ratio PRHPC. For example, in certain exemplary aspects, the HP compressor pressure ratio PRHPC defined by the HP compressor 24 may be at least 22 and less than or equal to 30 during an operating condition of the turbofan engine 10. The HP compressor pressure ratio PRHPC may refer to a pressure ratio of an airflow exiting the HP compressor 24 to a pressure of an airflow entering the HP compressor 24 during the operating condition of the turbofan engine 10.

Notably, with the LP compressor 22 being driven by the LP shaft 36 across the power gearbox 46, the LP turbine 30 can rotate at a relatively high speed, allowing for a shortening of the LP turbine 30. In particular, for the embodiment depicted, the LP turbine 30 is configured as a three-stage LP turbine 30 (having three stages of LP turbine rotor blades 31). Such may result in a relatively short LP turbine 30, further allowing for a reduction in overall length of the turbofan engine 10.

Further aspects are provided by the subject matter of the following clauses:

A turbofan engine defining an axial direction and a longitudinal centerline along the axial direction, the turbofan engine comprising: a fan section having a fan; a turbomachine drivingly coupled to the fan, the turbomachine comprising an outer casing; an outer nacelle surrounding the fan and at least a portion of the turbomachine, the turbofan engine defining a bypass passage between the outer nacelle and the turbomachine; an outlet guide vane extending between the turbomachine and the outer nacelle, the outlet guide vane defining a base and a tip and being forward swept from the base to the tip; and an acoustic treatment attached to or integrated with the outer casing at a location aligned with the outlet guide vane along the longitudinal centerline.

The turbofan engine of the preceding clause, wherein the outlet guide vane defines a junction with the outer casing at a leading edge of the outlet guide vane, and wherein the acoustic treatment is located at the junction, forward of the junction, or both.

The turbofan engine of any preceding clause, wherein the turbomachine defines an inlet, and wherein the acoustic treatment extends along the axial direction at least 50% of a distance along the axial direction from the inlet to the junction.

The turbofan engine of any preceding clause, wherein the acoustic treatment comprises a perforated sheet and a hollow body.

The turbofan engine of any preceding clause, wherein the outlet guide vane comprises an acoustic treatment on a pressure side, on a suction side, or both.

The turbofan engine of any preceding clause, wherein the outlet guide vane defines an OGV reference line extending from an inner junction between the outlet guide vane and the turbomachine at a leading edge of the outlet guide vane and an outer junction between the outlet guide vane and the outer nacelle at the leading edge of the outlet guide vane, wherein the turbofan engine defines a radial reference line extending perpendicularly from the longitudinal centerline, and wherein an angle between the OGV reference line and the radial reference line is at least 5 degrees and less than or equal to 45 degrees.

The turbofan engine of any preceding clause, wherein the angle between the OGV reference line and the radial reference line is at least 15 degrees and less than or equal to 35 degrees.

The turbofan engine of any preceding clause, wherein the outer nacelle comprises an outer attachment groove located at a trailing edge of the outlet guide vane.

The turbofan engine of any preceding clause, wherein the turbomachine comprises an inner attachment groove located at the trailing edge of the outlet guide vane, and wherein the inner attachment groove is located aft of the outer attachment groove.

The turbofan engine of any preceding clause, wherein the outer nacelle defines an inlet length, wherein the fan defines a fan diameter, and wherein a ratio of the inlet length to the fan diameter is less than or equal to 0.5.

The turbofan engine of any preceding clause, wherein the turbomachine comprises a reduction gearbox and a compressor section having a low pressure compressor, wherein the outlet guide vane defines an inner junction between the outlet guide vane and the turbomachine at the leading edge of the outlet guide vane, and wherein the inner junction is aligned with the low pressure compressor along the longitudinal centerline.

The turbofan engine of any preceding clause, wherein the compressor section further comprises a high pressure compressor, wherein the turbomachine comprises a compressor forward frame forward of the low pressure compressor and an inter-compressor frame between the high pressure compressor and the low pressure compressor, wherein the turbomachine further comprises a shell frame located between the compressor forward frame and the inter-compressor frame, and wherein the outlet guide vane is coupled to the shell frame.

The turbofan engine of any preceding clause, wherein the turbomachine comprises an A-sump cone and a load reduction device integrated into the sump cone or into an attachment of the sump cone.

The turbofan engine of any preceding clause, wherein the outlet guide vane is a first outlet guide vane of a plurality of outlet guide vanes, wherein each outlet guide vane of the plurality of outlet guide vanes defines a base and a tip and is forward swept from the base to the tip.

The turbofan engine of any preceding clause, wherein the acoustic treatment extends along a circumferential direction of the turbofan engine.

The turbofan engine of any preceding clause, wherein the acoustic treatment extends substantially completely along a circumferential direction of the turbofan engine.

The turbofan engine of any preceding clause, wherein the turbofan engine defines a bypass ratio equal to a ratio of a mass flowrate of airflow through the bypass passage to a mass flowrate of an airflow through an inlet of the turbomachine during cruise operations, wherein the bypass ratio is at least 5:1 and less than or equal to 20:1.

The turbofan engine of any preceding clause, wherein the fan defines a fan diameter greater than or equal to four feet and less than or equal to 18 feet.

The turbofan engine of any preceding clause, wherein the fan is a single stage fan.

The turbofan engine of any preceding clause, wherein the turbofan defines a maximum rated thrust at sea level greater than or equal to 30,000 pounds and less than or equal to 120,000 pounds.

A turbofan engine defining an axial direction and a longitudinal centerline along the axial direction, the turbofan engine comprising: a fan section having a fan; a turbomachine drivingly coupled to the fan, the turbomachine comprising an outer casing; an outer nacelle surrounding the fan and at least a portion of the turbomachine; an outlet guide vane extending between the turbomachine and the outer nacelle, the outlet guide vane defining a base and a tip and being forward swept from the base to the tip; and an accessory gearbox positioned at least partially inward of the outer casing of the turbomachine.

The turbofan engine of any preceding clause, wherein the accessory gearbox is positioned entirely within the outer casing of the turbomachine.

The turbofan engine of any preceding clause, wherein the accessory gearbox includes a first portion and a second portion, wherein the first portion is positioned within the outer casing of the turbomachine, and wherein the second portion is positioned outside of the outer casing.

The turbofan engine of any preceding clause, wherein the accessory gearbox comprises a drive assembly extending from the first portion to the second portion.

The turbofan engine of any preceding clause, further comprising: a strut extending between the turbomachine and the outer nacelle, and wherein the drive assembly extends into the strut.

The turbofan engine of any preceding clause, wherein the second portion is positioned in the outer nacelle.

The turbofan engine of any preceding clause, wherein the second portion is positioned in the strut.

The turbofan engine of any preceding clause, wherein the drive assembly comprises a drive shaft, a hydraulic drive, or a combination thereof.

The turbofan engine of any preceding clause, wherein the outlet guide vane defines an OGV reference line extending from an inner junction between the outlet guide vane and the turbomachine at a leading edge of the outlet guide vane and an outer junction between the outlet guide vane and the outer nacelle at the leading edge of the outlet guide vane, wherein the turbofan engine defines a radial reference line extending perpendicularly from the longitudinal centerline, and wherein an angle between the OGV reference line and the radial reference line is at least 5 degrees and less than or equal to 45 degrees.

The turbofan engine of any preceding clause, wherein the angle between the OGV reference line and the radial reference line is at least 15 degrees and less than or equal to 35 degrees.

The turbofan engine of any preceding clause, wherein the outer nacelle comprises an outer attachment groove located at a trailing edge of the outlet guide vane.

The turbofan engine of any preceding clause, wherein the turbomachine comprises an inner attachment groove located at the trailing edge of the outlet guide vane, and wherein the inner attachment groove is located aft of the outer attachment groove.

The turbofan engine of any preceding clause, wherein the outer nacelle defines an inlet length, wherein the fan defines a fan diameter, and wherein a ratio of the inlet length to the fan diameter is less than or equal to 0.5.

The turbofan engine of any preceding clause, wherein the outlet guide vane is a first outlet guide vane of a plurality of outlet guide vanes, wherein each outlet guide vane of the plurality of outlet guide vanes defines a base and a tip and is forward swept from the base to the tip.

The turbofan engine of any preceding clause, wherein the turbofan engine defines a bypass ratio equal to a ratio of a mass flowrate of airflow through the bypass passage to a mass flowrate of an airflow through an inlet of the turbomachine during cruise operations, wherein the bypass ratio is at least 5:1 and less than or equal to 20:1.

The turbofan engine of any preceding clause, wherein the fan defines a fan diameter greater than or equal to four feet and less than or equal to 18 feet.

The turbofan engine of any preceding clause, wherein the fan is a single stage fan.

The turbofan engine of any preceding clause, wherein the turbofan defines a maximum rated thrust at sea level greater than or equal to 30,000 pounds and less than or equal to 120,000 pounds.

The turbofan engine of any preceding clause, further comprising: an acoustic treatment attached to or integrated with the outer casing at a location aligned with the outlet guide vane along the longitudinal centerline.

The turbofan engine of any preceding clause, wherein the outlet guide vane defines a junction with the outer casing at a leading edge of the outlet guide vane, and wherein the acoustic treatment is located at the junction, forward of the junction, or both.

A turbofan engine defining an axial direction and a longitudinal centerline along the axial direction, the turbofan engine comprising: a fan section having a fan, the fan comprising a plurality of fan blades; a turbomachine drivingly coupled to the fan, the turbomachine comprising an outer casing; an outer nacelle surrounding the fan and at least a portion of the turbomachine; an outlet guide vane extending between the turbomachine and the outer nacelle at a location downstream of the plurality of fan blades, the outlet guide vane defining a base and a tip and being forward swept from the base to the tip; and an inlet pre-swirl feature attached to or integrated into the outer nacelle at a location upstream of the plurality of fan blades.

The turbofan engine of any preceding clause, wherein the inlet pre-swirl feature is transitionable between a first angle with respect to the longitudinal centerline and a second angle with respect to the longitudinal centerline.

The turbofan engine of any preceding clause, wherein the inlet pre-swirl feature is a first inlet pre-swirl feature transitionable between a first angle with respect to the longitudinal centerline and a second angle with respect to the longitudinal centerline, wherein the turbofan engine further comprises: a second inlet pre-swirl feature located upstream of the plurality of fan blades, the second inlet pre-swirl feature attached to or integrated into the outer nacelle, wherein the second inlet pre-swirl feature is transitionable between a third angle with respect to the longitudinal centerline of the turbofan engine and a fourth angle with respect to the longitudinal centerline of the turbofan engine; wherein the first inlet pre-swirl feature and the second inlet pre-swirl feature are independently controlled.

The turbofan engine of any preceding clause, wherein the inlet pre-swirl feature includes a leading edge, a trailing edge, and defines an opening at the trailing edge.

The turbofan engine of any preceding clause, further comprising: a controller having one or more processors and one or more memory devices, the one or more memory devices storing instructions that when executed by the one or more processors cause the one or more processors to perform operations, in performing the operations, the one or more processors are configured to: receive an input indicating a condition of the plurality of fan blades; and in response to the condition of the plurality of fan blades, modulate a high pressure airflow through the opening at the trailing edge of the inlet pre-swirl feature during operation of the turbofan engine.

The turbofan engine of any preceding clause, wherein the inlet pre-swirl feature comprises a part-span inlet guide vane.

The turbofan engine of any preceding clause, wherein the part span inlet guide comprises an acoustic treatment.

The turbofan engine of any preceding clause, wherein the outer nacelle defines an inlet length, wherein the fan defines a fan diameter, and wherein a ratio of the inlet length to the fan diameter is less than or equal to 0.5.

The turbofan engine of any preceding clause, wherein The turbofan engine of claim 1, wherein the outlet guide vane defines an OGV reference line extending from an inner junction between the outlet guide vane and the turbomachine at a leading edge of the outlet guide vane and an outer junction between the outlet guide vane and the outer nacelle at the leading edge of the outlet guide vane, wherein the turbofan engine defines a radial reference line extending perpendicularly from the longitudinal centerline, and wherein an angle between the OGV reference line and the radial reference line is at least 5 degrees and less than or equal to 45 degrees.

The turbofan engine of any preceding clause, wherein the angle between the OGV reference line and the radial reference line is at least 15 degrees and less than or equal to 35 degrees.

The turbofan engine of any preceding clause, wherein the outer nacelle comprises an outer attachment groove located at a trailing edge of the outlet guide vane.

The turbofan engine of any preceding clause, wherein the turbomachine comprises an inner attachment groove located at the trailing edge of the outlet guide vane, and wherein the inner attachment groove is located aft of the outer attachment groove.

The turbofan engine of any preceding clause, wherein the outer nacelle defines an inlet length, wherein the fan defines a fan diameter, and wherein a ratio of the inlet length to the fan diameter is less than or equal to 0.5.

The turbofan engine of any preceding clause, wherein the outlet guide vane is a first outlet guide vane of a plurality of outlet guide vanes, wherein each outlet guide vane of the plurality of outlet guide vanes defines a base and a tip and is forward swept from the base to the tip.

The turbofan engine of any preceding clause, wherein the turbofan engine defines a bypass ratio equal to a ratio of a mass flowrate of airflow through the bypass passage to a mass flowrate of an airflow through an inlet of the turbomachine during cruise operations, wherein the bypass ratio is at least 5:1 and less than or equal to 20:1.

The turbofan engine of any preceding clause, wherein the fan defines a fan diameter greater than or equal to four feet and less than or equal to 18 feet.

The turbofan engine of any preceding clause, wherein the fan is a single stage fan.

The turbofan engine of any preceding clause, wherein the turbofan defines a maximum rated thrust at sea level greater than or equal to 30,000 pounds and less than or equal to 120,000 pounds.

The turbofan engine of any preceding clause, further comprising: an acoustic treatment attached to or integrated with the outer casing at a location aligned with the outlet guide vane along the longitudinal centerline.

The turbofan engine of any preceding clause, wherein the outlet guide vane defines a junction with the outer casing at a leading edge of the outlet guide vane, and wherein the acoustic treatment is located at the junction, forward of the junction, or both.

A turbofan engine defining an axial direction and a longitudinal centerline along the axial direction, the turbofan engine comprising: a fan section having a fan, the fan comprising a plurality of fan blades; a turbomachine drivingly coupled to the fan, the turbomachine comprising a compressor section with a low pressure compressor, a turbine section with a low pressure turbine, a reduction gearbox, and an outer casing, the low pressure turbine drivingly coupled to the low pressure compressor across the reduction gearbox; an outer nacelle surrounding the fan and at least a portion of the turbomachine; an outlet guide vane extending between the turbomachine and the outer nacelle at a location downstream of the plurality of fan blades, the outlet guide vane defining a base and a tip and being forward swept from the base to the tip.

The turbofan engine of any preceding clause, wherein the low pressure compressor is directly rotatable with the fan.

The turbofan engine of any preceding clause, wherein the reduction gearbox is aligned with the low pressure compressor along the longitudinal centerline.

The turbofan engine of any preceding clause, wherein the outer nacelle defines an inlet length, wherein the fan defines a fan diameter, and wherein a ratio of the inlet length to the fan diameter is less than or equal to 0.5.

The turbofan engine of any preceding clause, wherein the low pressure turbine is a three-stage low pressure turbine.

The turbofan engine of any preceding clause, wherein the compressor section further comprises a high pressure compressor, wherein the high pressure compressor defines a compressor pressure ratio of at least 22 and less than or equal to 30.

The turbofan engine of any preceding clause, wherein the turbomachine comprises an inter-compressor frame, and wherein the base of the outlet guide vane is coupled to the inter-compressor frame.

The turbofan engine of any preceding clause, wherein the base of the outlet guide vane is aligned with the inter-compressor frame along the longitudinal centerline.

The turbofan engine of any preceding clause, wherein the outlet guide vane defines an OGV reference line extending from an inner junction between the outlet guide vane and the turbomachine at a leading edge of the outlet guide vane and an outer junction between the outlet guide vane and the outer nacelle at the leading edge of the outlet guide vane, wherein the turbofan engine defines a radial reference line extending perpendicularly from the longitudinal centerline, and wherein an angle between the OGV reference line and the radial reference line is at least 5 degrees and less than or equal to 45 degrees.

The turbofan engine of any preceding clause, wherein the angle between the OGV reference line and the radial reference line is at least 15 degrees and less than or equal to 35 degrees.

The turbofan engine of any preceding clause, wherein the outer nacelle comprises an outer attachment groove located at a trailing edge of the outlet guide vane.

The turbofan engine of any preceding clause, wherein the turbomachine comprises an inner attachment groove located at the trailing edge of the outlet guide vane, and wherein the inner attachment groove is located aft of the outer attachment groove.

The turbofan engine of any preceding clause, wherein the outer nacelle defines an inlet length, wherein the fan defines a fan diameter, and wherein a ratio of the inlet length to the fan diameter is less than or equal to 0.5.

The turbofan engine of any preceding clause, wherein the outlet guide vane is a first outlet guide vane of a plurality of outlet guide vanes, wherein each outlet guide vane of the plurality of outlet guide vanes defines a base and a tip and is forward swept from the base to the tip.

The turbofan engine of any preceding clause, wherein the turbofan engine defines a bypass ratio equal to a ratio of a mass flowrate of airflow through the bypass passage to a mass flowrate of an airflow through an inlet of the turbomachine during cruise operations, wherein the bypass ratio is at least 5:1 and less than or equal to 20:1.

The turbofan engine of any preceding clause, wherein the fan defines a fan diameter greater than or equal to four feet and less than or equal to 18 feet.

The turbofan engine of any preceding clause, wherein the fan is a single stage fan.

The turbofan engine of any preceding clause, wherein the turbofan defines a maximum rated thrust at sea level greater than or equal to 30,000 pounds and less than or equal to 120,000 pounds.

The turbofan engine of any preceding clause, further comprising: an acoustic treatment attached to or integrated with the outer casing at a location aligned with the outlet guide vane along the longitudinal centerline.

The turbofan engine of any preceding clause, wherein the outlet guide vane defines a junction with the outer casing at a leading edge of the outlet guide vane, and wherein the acoustic treatment is located at the junction, forward of the junction, or both.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A turbofan engine defining an axial direction and a longitudinal centerline along the axial direction, the turbofan engine comprising:
a fan section having a fan;
a turbomachine drivingly coupled to the fan, the turbomachine comprising an outer casing and a compressor section, the compressor section comprising a high pressure compressor and a low pressure compressor;
an outer nacelle surrounding the fan and at least a portion of the turbomachine;
an outlet guide vane extending between the turbomachine and the outer nacelle, the outlet guide vane defining a base and a tip and being forward swept from the base to the tip; and
an accessory gearbox positioned at least partially inward of the outer casing of the turbomachine,
wherein the base of the outlet guide vane is located forward of the high pressure compressor and aligned with or located aft of the low pressure compressor, and wherein the tip of the outlet guide vane located forward of the low pressure compressor.

2. The turbofan engine of claim 1, wherein the base of the outlet guide vane is located forward of the high pressure compressor and aft of the low pressure compressor.

3. The turbofan engine of claim 1, wherein the outlet guide vane defines an inner junction between the outlet guide vane and the turbomachine at the leading edge of the outlet guide vane, and wherein the inner junction is aligned with the low pressure compressor along the longitudinal centerline.

4. The turbofan engine of claim 1, wherein the outer nacelle comprises an outer attachment groove located at a trailing edge of the outlet guide vane, wherein the turbomachine comprises an inner attachment groove located at the trailing edge of the outlet guide vane, and wherein the inner attachment groove is located aft of the outer attachment groove.

5. The turbofan engine of claim 1, wherein the acoustic treatment is attached to or integrated with the outer casing at a location aligned with the base of the outlet guide vane along the longitudinal centerline.

6. The turbofan engine of claim 1, wherein the accessory gearbox is positioned entirely within the outer casing of the turbomachine.

7. The turbofan engine of claim 1, wherein the accessory gearbox includes a first portion and a second portion, wherein the first portion is positioned within the outer casing of the turbomachine, and wherein the second portion is positioned outside of the outer casing.

8. The turbofan engine of claim 7, wherein the accessory gearbox comprises a drive assembly extending from the first portion to the second portion.

9. The turbofan engine of claim 7, wherein the second portion is positioned in the strut.

10. The turbofan engine of claim 8, further comprising:
a strut extending between the turbomachine and the outer nacelle, and wherein the drive assembly extends into the strut.

11. The turbofan engine of claim 10, wherein the second portion is positioned in the outer nacelle.

12. The turbofan engine of claim 8, wherein the drive assembly comprises a drive shaft, a hydraulic drive, or a combination thereof.

13. The turbofan engine of claim 1, wherein the outlet guide vane defines an OGV reference line extending from an inner junction between the outlet guide vane and the turbomachine at a leading edge of the outlet guide vane and an outer junction between the outlet guide vane and the outer nacelle at the leading edge of the outlet guide vane, wherein the turbofan engine defines a radial reference line extending perpendicularly from the longitudinal centerline, and wherein an angle between the OGV reference line and the radial reference line is at least 5 degrees and less than or equal to 45 degrees.

14. The turbofan engine of claim 13, wherein the angle between the OGV reference line and the radial reference line is at least 15 degrees and less than or equal to 35 degrees.

15. The turbofan engine of claim 1, wherein the outer nacelle comprises an outer attachment groove located at a trailing edge of the outlet guide vane.

16. The turbofan engine of claim 15, wherein the turbomachine comprises an inner attachment groove located at the trailing edge of the outlet guide vane, and wherein the inner attachment groove is located aft of the outer attachment groove.

17. The turbofan engine of claim 1, wherein the outer nacelle defines an inlet length, wherein the fan defines a fan diameter, and wherein a ratio of the inlet length to the fan diameter is less than or equal to 0.5.

18. The turbofan engine of claim 1, wherein the outlet guide vane is a first outlet guide vane of a plurality of outlet guide vanes, wherein each outlet guide vane of the plurality of outlet guide vanes defines a base and a tip and is forward swept from the base to the tip.

19. The turbofan engine of claim 1, wherein the outlet guide vane defines a junction with the outer casing at a leading edge of the outlet guide vane, and wherein the acoustic treatment is located at the junction, forward of the junction, or both.

* * * * *